US008171597B2

(12) United States Patent
Yagi

(10) Patent No.: US 8,171,597 B2
(45) Date of Patent: May 8, 2012

(54) WIPER MOTOR AND WIPER APPARATUS

(75) Inventor: Hideyuki Yagi, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 1086 days.

(21) Appl. No.: 11/724,170

(22) Filed: Mar. 15, 2007

(65) Prior Publication Data

US 2007/0261191 A1 Nov. 15, 2007

(30) Foreign Application Priority Data

May 9, 2006 (JP) .................................. 2006-130142

(51) Int. Cl.
*B60S 1/06* (2006.01)
*B60S 1/26* (2006.01)
*F16D 7/02* (2006.01)

(52) U.S. Cl. ................... 15/250.3; 15/250.31; 192/56.6; 192/56.61; 74/425

(58) Field of Classification Search ............. 15/250.3, 15/250.31, 250.16, 250.17; 74/425; 192/56.61, 192/56.6, 56.1
See application file for complete search history.

(56) References Cited

U.S. PATENT DOCUMENTS

| | | | | |
|---|---|---|---|---|
| 3,026,555 | A * | 3/1962 | Dudley ..................... | 15/250.202 |
| 4,774,423 | A * | 9/1988 | Karasawa et al. .............. | 310/78 |
| 5,570,923 | A * | 11/1996 | Taylor ........................... | 296/164 |
| 5,875,681 | A * | 3/1999 | Gerrand et al. ................. | 74/427 |
| 6,026,536 | A * | 2/2000 | Miller et al. ............... | 15/250.31 |
| 6,609,266 | B1 * | 8/2003 | Satoh et al. ................ | 15/250.13 |
| 6,978,510 | B2 * | 12/2005 | Knauf .......................... | 15/250.3 |
| 2005/0097698 | A1 | 5/2005 | Yagi et al. | |
| 2005/0097699 | A1 | 5/2005 | Yagi et al. | |
| 2006/0101603 | A1 | 5/2006 | Yagi | |

FOREIGN PATENT DOCUMENTS

| | | |
|---|---|---|
| JP | A-S64-44367 | 2/1989 |
| JP | A-2006-51835 | 2/2006 |

OTHER PUBLICATIONS

Extended European Search Report dated May 7, 2010 issued from the European Patent Office in the corresponding European patent application No. 07005718.7-2424.
Chinese First Office Action dated Apr. 8, 2010 issued from the Chinese Patent Office in the corresponding Chinese patent application No. 20071010101178.5 (with English translation).
Japanese Office Action mailed Aug. 30, 2011 issued from the Japanese Patent Office in the corresponding Japanese patent application No. 2006-130142 (with English translation).

* cited by examiner

*Primary Examiner* — Gary Graham
(74) *Attorney, Agent, or Firm* — Posz Law Group, PLC

(57) ABSTRACT

A wiper motor has an output shaft that outputs a to-and-fro rotation to swing a wiper pivotally. A transmission mechanism transmits the rotational force from the motor body. A clutch mechanism lets the transmission mechanism run idle not to transmit the rotational force from the transmission mechanism to the output shaft when the output shaft is subjected to a torque larger than an engagement releasing torque. The engagement releasing torque is specified to a value larger than a maximum wiping torque to which the torque applied by the wiper onto the output shaft is estimated to reach during a normal wiping operation of the wiper.

12 Claims, 17 Drawing Sheets

WIPER MOTOR AND WIPER APPARATUS

CROSS REFERENCE TO RELATED APPLICATION

This application is based upon and claims the benefit of priority of Japanese Patent Application No. 2006-130142 filed on May 9, 2006, the content of which is incorporated herein by reference.

FIELD OF THE INVENTION

The present invention relates to a wiper motor and a wiper apparatus having the wiper motor.

BACKGROUND OF THE INVENTION

When a wiper arm is hindered from operating in a wiper apparatus that swings on and wipes a surface of a windshield glass of a vehicle, an excessively large load acts on an output shaft of a wiper motor. This excessively large load can break a swing mechanism, a speed-reducing mechanism and other components in the wiper motor. In order to prevent the breakage of the mechanisms and parts, every part that constitutes the swing mechanism, the speed-reducing mechanism and the other components in the wiper motor is specified so as to have a strength that endures the excessively large load acting on the output shaft of the wiper motor. Thus, the above-mentioned factor in designing the wiper motor can increase a size and a weight of conventional wiper motor.

In view of the above-mentioned designing factor of the wiper motor which increases the size and the weight, the applicant of the present invention has put forth a wiper motor with a clutch mechanism integrated therein, to cut a load transmission between the output shaft and the swing mechanism or the speed-reducing mechanism, as disclosed in JP-2006-51835-A. In the wiper motor outfitted with this clutch mechanism, the excessively large load applied on the output shaft does not transfer to the swing mechanism and to a main body of the wiper motor. Consequently, it is possible to decrease the strength of the parts constituting the above-mentioned swing mechanism, the speed-reducing mechanism and the other components in designing the wiper motor, so as to decrease its size, weight and manufacturing cost.

However, even in a case that a wiping load acting on a wiper blade increases during an operation of the wiper apparatus and that a variation of the wiping load acting about an axis of the output shaft is within an assumed value, it is concerned that the wiping load can work the clutch mechanism to frequently cut the load transmission between the output shaft and the swing mechanism, etc. When the wiping load variation works the clutch mechanism as mentioned above, the wiper blade can stop wiping a wiping surface undesirably.

Further, when the wiper apparatus is turned on while accumulated snow and/or frozen ice is locking the wiper blade at a certain wiping angle on the windshield glass, the clutch mechanism cuts the load transmission between the output shaft and the motor body-side mechanism, and the motor body keeps operating the swing mechanism and the other components in the wiper motor. Thus, an operating noise that is continuously generated during the lock of the wiper blade can be an objectionable sound to a passenger in a vehicle.

Contrarily, in a case that an operating load and an engagement releasing torque of the clutch mechanism is too large, external force acting on the output shaft side can break the parts of the wiper motor with decreased strengths, prior to the operation of the clutch mechanism.

SUMMARY OF THE INVENTION

The present invention is achieved in view of the above-described problems, and has an object to provide a wiper motor and a wiper apparatus that can realize a decrease of the size and the weight, and a protection of the internal mechanisms of the wiper motor concurrently, by designing the clutch mechanism so as to operate in response to a proper external load.

The wiper motor is for pivotally driving a wiper to and fro, and includes a wiper motor, an output shaft, a transmission mechanism and a clutch mechanism. The motor body generates a rotational force. The output shaft is coupled to the wiper so as to rotate the wiper. The transmission mechanism transmits the rotational force from the motor body. The clutch mechanism transmits the rotational force from the transmission mechanism to the output shaft when the output shaft is subjected to a torque not larger than an engagement releasing torque, and lets the transmission mechanism run idle not to transmit the rotational force from the transmission mechanism to the output shaft when the output shaft is subjected to a torque larger than the engagement releasing torque. The engagement releasing torque is specified to a value larger than a maximum wiping torque to which the torque applied by the wiper onto the output shaft is estimated to reach during a normal wiping operation of the wiper.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

In the following are described wiper motors and wiper apparatuses according to three embodiments of the present invention. Members, their arrangements, and other features of the wiper motors and the wiper apparatuses that are described below do not limit the scope of the present invention, and may naturally be modified in accordance with a nature of the present invention.

Figure 1:
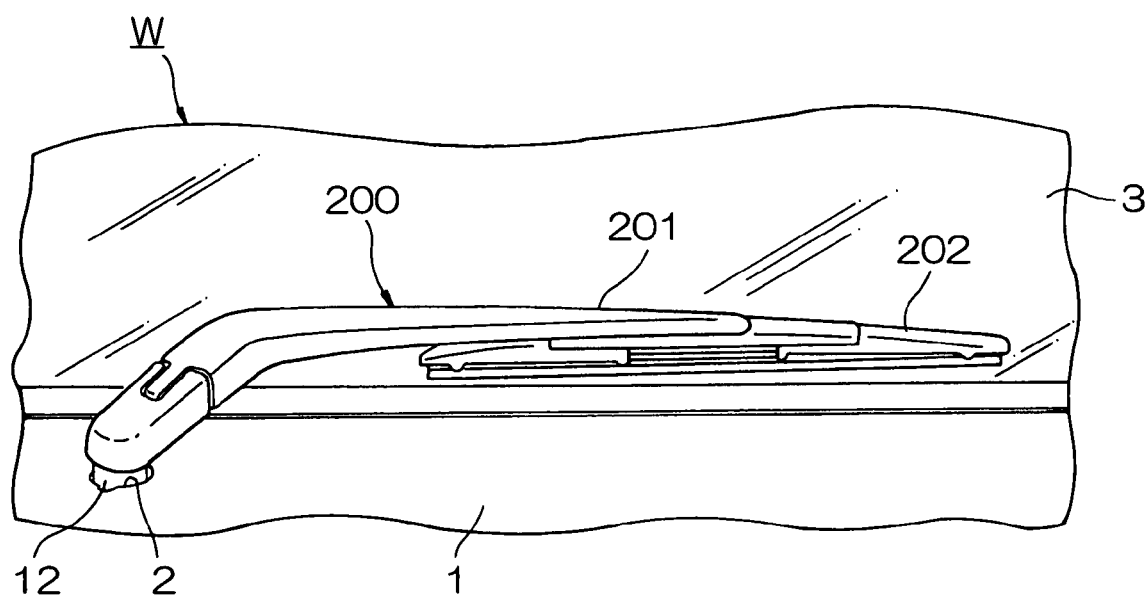
FIG. 1 is a front view showing a wiper apparatus according to a first embodiment of the present invention.
Figure 2:
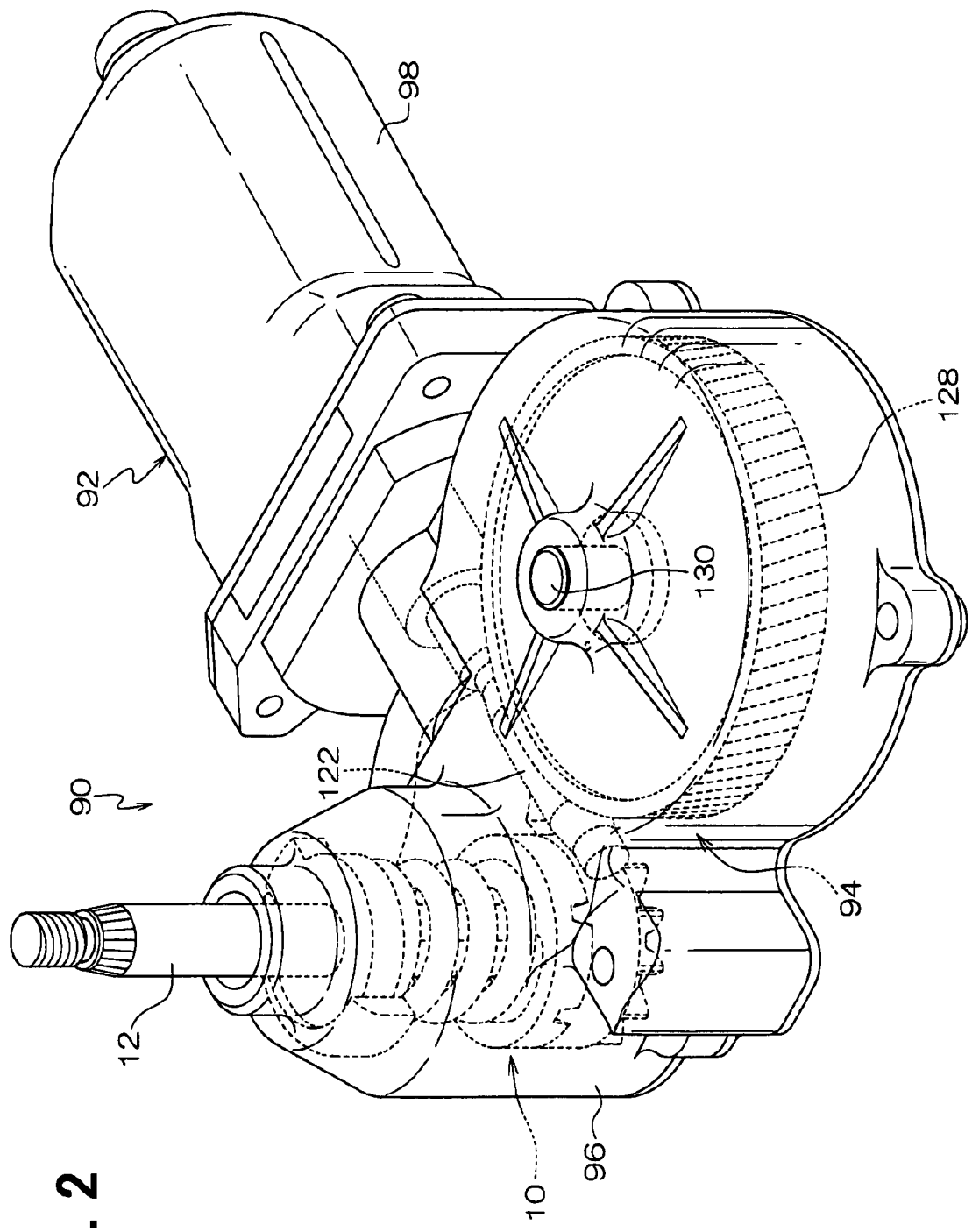
FIG. 2 is a perspective view showing a wiper motor of the wiper apparatus according to the first embodiment.
Figure 3:
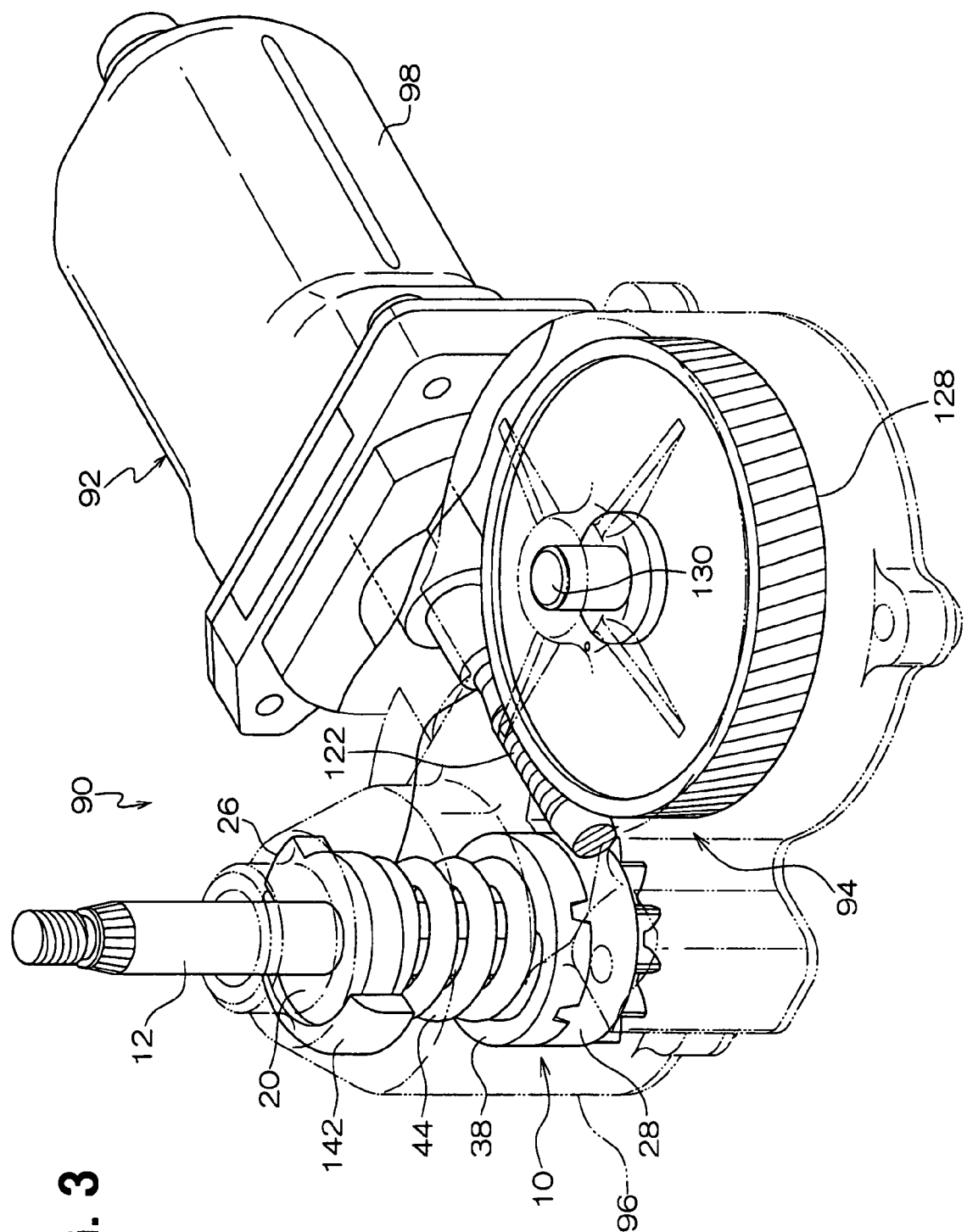
FIG. 3 is a partially-transparent perspective view showing the wiper motor according to the first embodiment.
Figure 4:
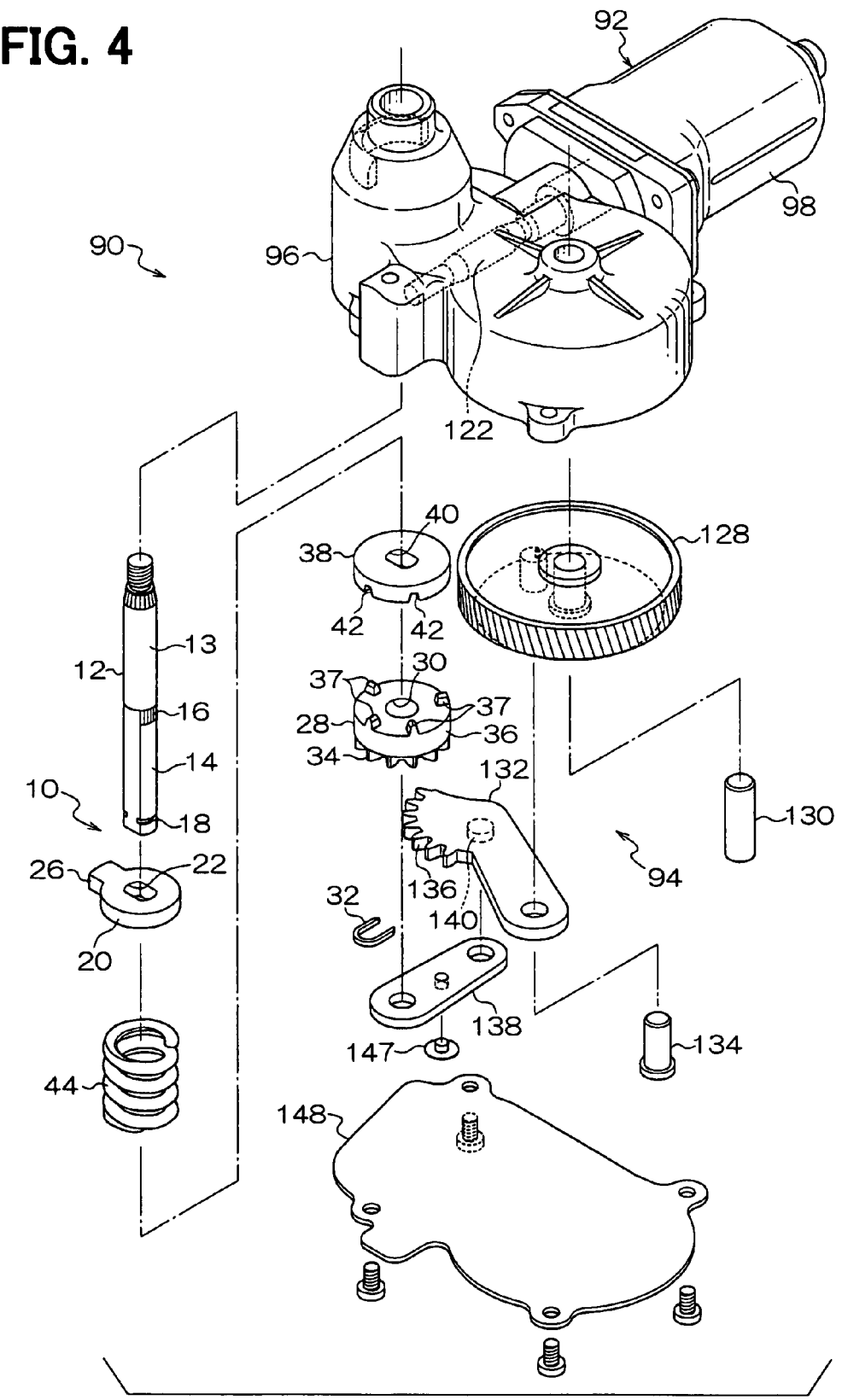
FIG. 4 is an exploded view showing the wiper motor according to the first embodiment.
Figure 5:
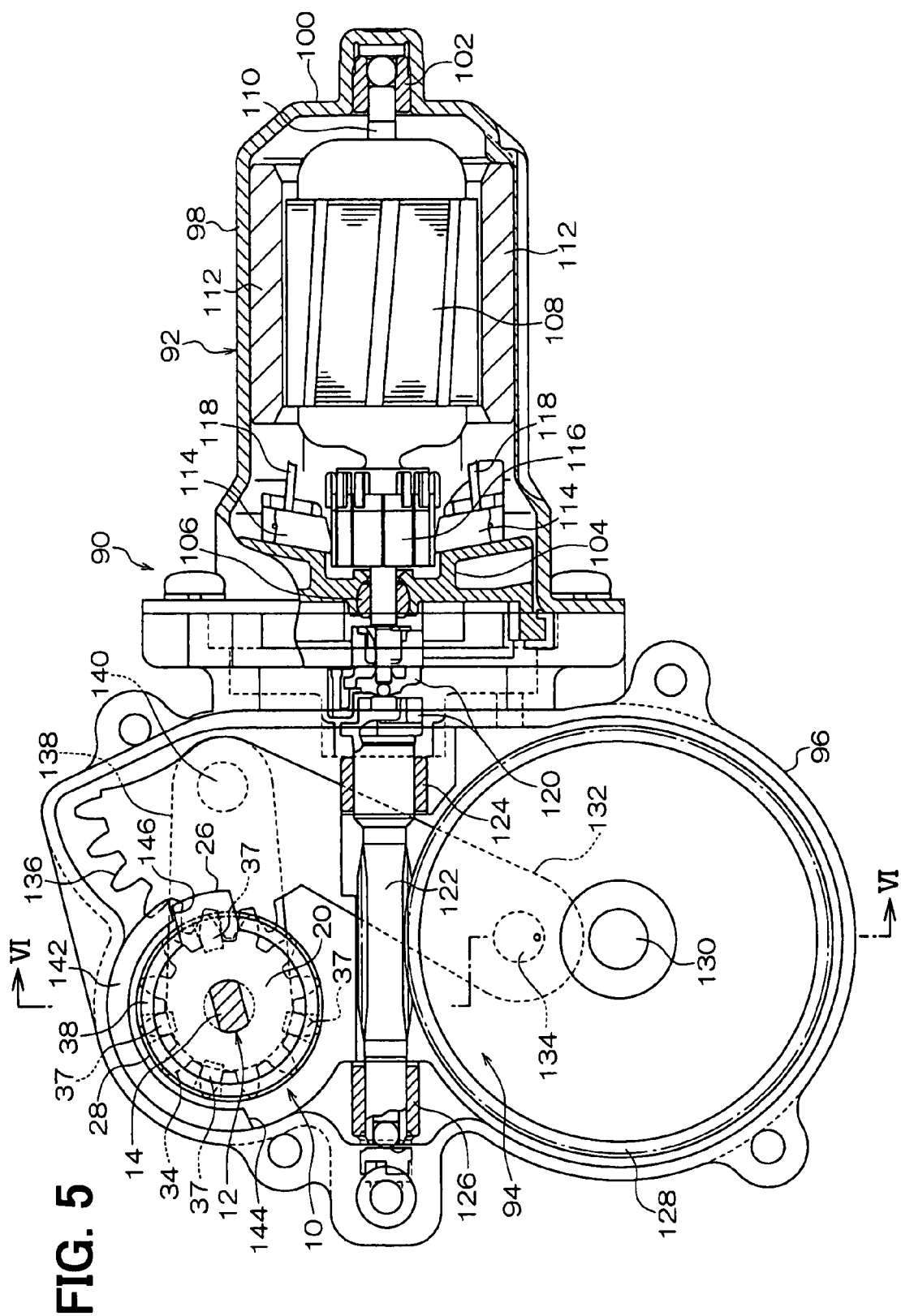
FIG. 5 is a cross-sectional view showing the wiper motor according to the first embodiment.

FIG. 1 depicts a wiper apparatus W according to a first embodiment of the present invention. The wiper apparatus W principally includes a wiper motor 90 (refer to FIG. 2, etc.) that is for driving a wiper and installed in a vehicle body, and a wiper body 200 that is coupled to the wiper motor 90.

The wiper motor 90 is installed in the vehicle body 1 in a position that an output shaft 12 protrudes from an output shaft hole 2 formed on a vehicle body 1.

In the first embodiment, the wiper 200 includes a wiper arm 201 and a wiper blade 202. A base end of the wiper arm 201 is fixed on the output shaft 12, and the wiper blade 202 is rotatably connected to a leading end of the wiper arm 201.

The wiper blade 202 is ordinarily biased onto and kept in contact with a windshield glass 3, which is a target wipe surface, by a biasing member (not shown) that is provided in the wiper arm 201. While the wiper motor 90 operates, the wiper arm 201 and the wiper blade 202 swing in a predetermined range of angle about a rotation axis of the output shaft 12. Thus, the wiper blade 202 can wipe the surface of the windshield glass 3 to and fro.

As shown in FIGS. 2-9, etc., the wiper motor 90 includes a motor body 92, a swing mechanism (transmission mechanism) 94 and a clutch mechanism 10.

In the first embodiment, the clutch mechanism 10 has the output shaft 12. As described below, when external force is acting on the output shaft 12 and a torque acting about the output shaft 12 is larger than an engagement releasing torque with a set magnitude, the clutch mechanism 10 is set in a releasing position in which the swing mechanism 94 runs idle with respect to the output shaft 12 to cut the external force transmission from the output shaft 12 to the motor body 92.

The motor body 92 has a construction in which an armature 108 and other parts are located in a yoke housing 98, and in which a housing 96 having a hollow and an opening is connected to the yoke housing 98. The housing 96 houses the swing mechanism 94 and the clutch mechanism 10, and a cover plate 148 closes the opening side (counter-output shaft side) of the housing 96.

The yoke housing 98 has a generally cup-like shape with a bottom. One axial end portion of the yoke housing 98 is formed by a drawing process and provided with a bottom. The yoke housing 98 has a generally flat circumferential surface. That is, a cross-section of the yoke housing 98 is narrower in a direction that is perpendicular to a rotation axis 110 and in parallel with the output shaft 12. An opening of the yoke housing 98 is integrally fixed to the housing 96.

On the opening-side end of the yoke housing 98 is fixed a housing end member 104. The housing end member 104 is made of electrically-insulating resin. A bearing 106 is located in a central portion of the housing end member 104. Another bearing 102 is located in a protruding portion of a bottom wall 100 of the yoke housing 98.

The rotation axis 110 of the armature 108 is rotatably supported by the bearings 102, 106 and installed inside the yoke housing 98. On an inner circumferential surface of the yoke housing 98 are fixed magnets 112 in an orientation to face the armature 108.

Further, the housing end member 104 holds brush cases and generally rectangular bar-shaped brushes 114. The brushes 114 is biased toward commutators 116 of the armature 108 by a biasing means (not shown), to let leading end portions of the brushes 114 be in contact with the commutators 116. Connection pig tails 118 are attached on the brushes 114, and the brushes 114 are electrically connected to a power-supplying electric wire via the pig tails 118.

On one end portion of the rotation axis 110 of the armature 108 (motor body 92), which protrudes into the housing 96, is fixed a coupling 120. The coupling 120 couples the rotation axis 110 of the motor body 92 to a worm gear 122 of the swing mechanism 94.

The swing mechanism 94 has a construction including the worm gear 122, a worm wheel 128 made of resin, a sector gear 132, a support lever 138, etc. The worm gear 122 and the worm wheel 128 serve as the speed-reducing mechanism. The worm wheel 128, the sector gear 132 and the support lever 138 serve as the swing mechanism.

Two bearings 124, 126, which are provided in the housing 96, rotatably supports both end portion of the worm gear 122.

The housing 96 installs a rotation axis 130, which is generally perpendicular to a center axis of the worm gear 122, i.e., the rotation axis 110, and is generally in parallel with a center axis of the output shaft 12. The worm wheel 128 is fixed on the rotation axis 130 to be in gear with the worm gear 122.

The worm gear 122 is coupled to the sector gear 132 of the swing mechanism. Specifically, a support axis 134 protrudes on a rear surface of the worm wheel 128, that is, cover plate (148)-side surface of the worm wheel. The support axis 134 is formed at a position different from a position of the rotation axis 130, that is, the support axis 134 is radially displaced from the rotation axis 130. The support axis 130 rotatably supports one end portion of the sector gear 132.

On a rear end surface on the other end portion of the sector gear 132 protrudes a support axis 140. The sector gear 132 has gear cogs 136 in a sector-like arrangement approximately centered on the support axis 140. The gear cogs 136 are engaged with an input disk 28 of the clutch mechanism 10 that is explained hereafter.

One end of the support lever 138 is rotatably coupled to the support axis 140. The other end of the support lever 138 is rotatably coupled to a rotation center of the input disk, i.e., to the output shaft 12. Thus, a pitch between the support axis 140 and the output shaft 12 is maintained, so as to keep an engaging state between the sector gear 132 and the input disk 28. Accordingly, the sector gear 132 swings to and fro in accordance with the rotation of the worm wheel 128, and the input disk 28 rotates to and fro in accordance with the swing motion of the sector gear 132. Then, the output shaft 12 interlocks with the input disk 28 and rotates to and fro, so that the wiper 200, which is fixed on a leading end of the output shaft 12 wipes the surface of the windshield glass 3 to and fro.

Figure 8:
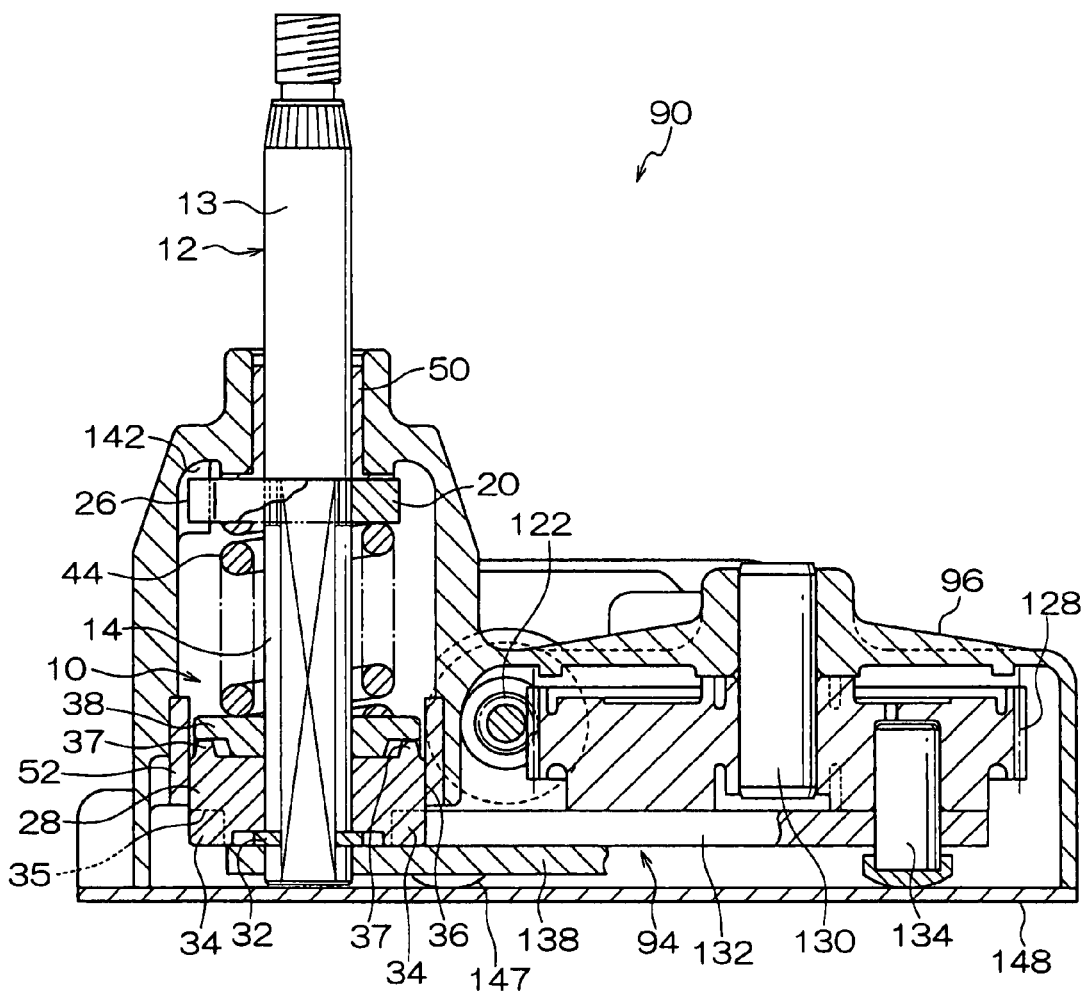
FIG. 8 is another cross-sectional view showing the wiper motor according to the first embodiment, which is taken along line VIII-VIII in FIG. 7.

On the rear surface of the support lever 138 is fixed a slider 147 that is made of resin and the like. This slider 147 is in sliding contact with the cover plate 148 during the to-and-fro swing motion of the sector gear 132, as shown in FIG. 8, etc. Thus, the support lever 138 is prevented from moving in its thickness direction, i.e., in an axial direction of the output shaft 12.

The wiper 200 is directly coupled to the output shaft 12 in the first embodiment, however, it is also possible to couple the wiper 200 indirectly to the output shaft 12 so as to interpose a link, a rod, and the like therebetween.

Figure 10:
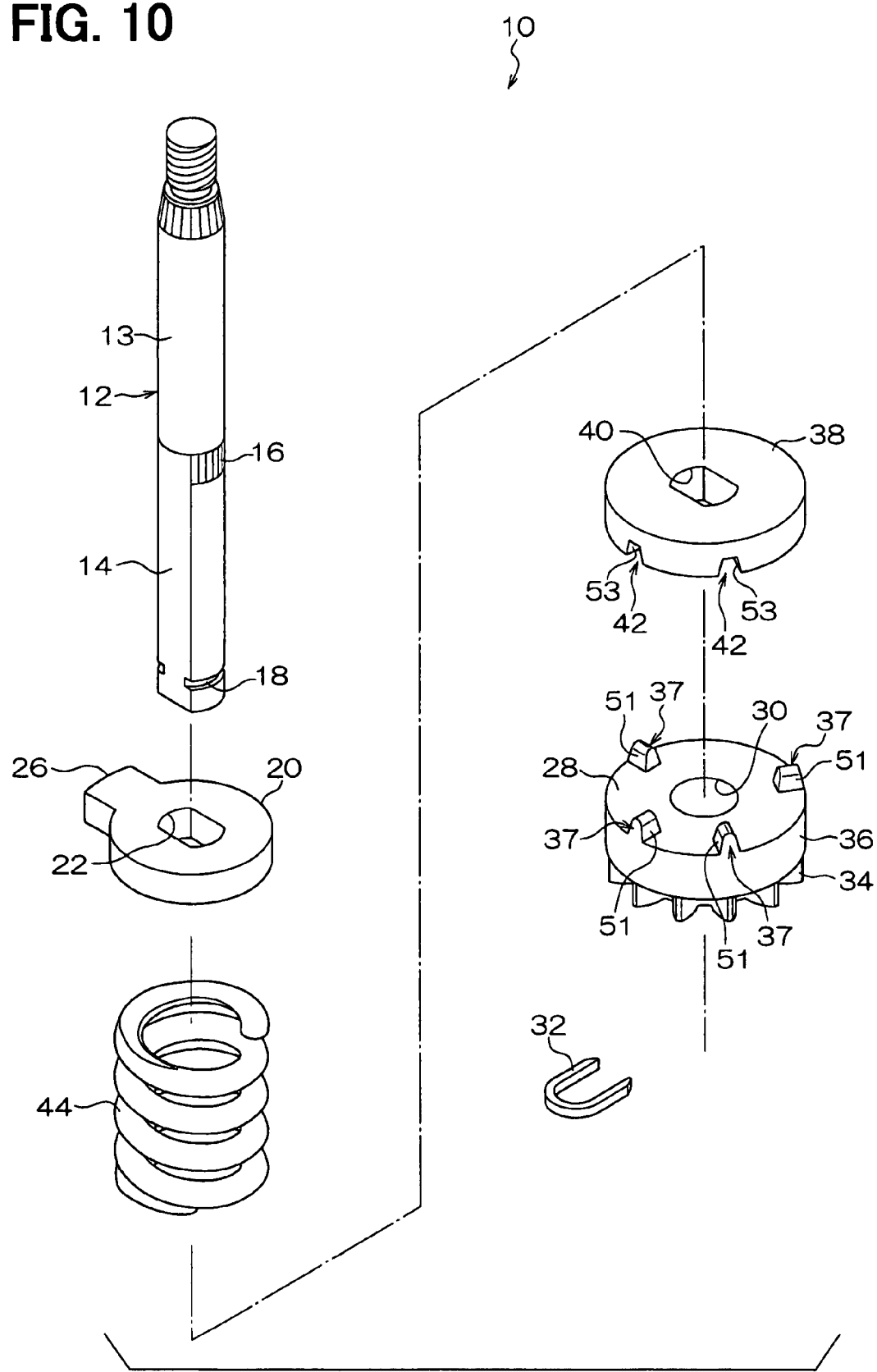
FIG. 10 is an exploded perspective view of a clutch mechanism of the wiper motor according to the first embodiment.
Figure 11:
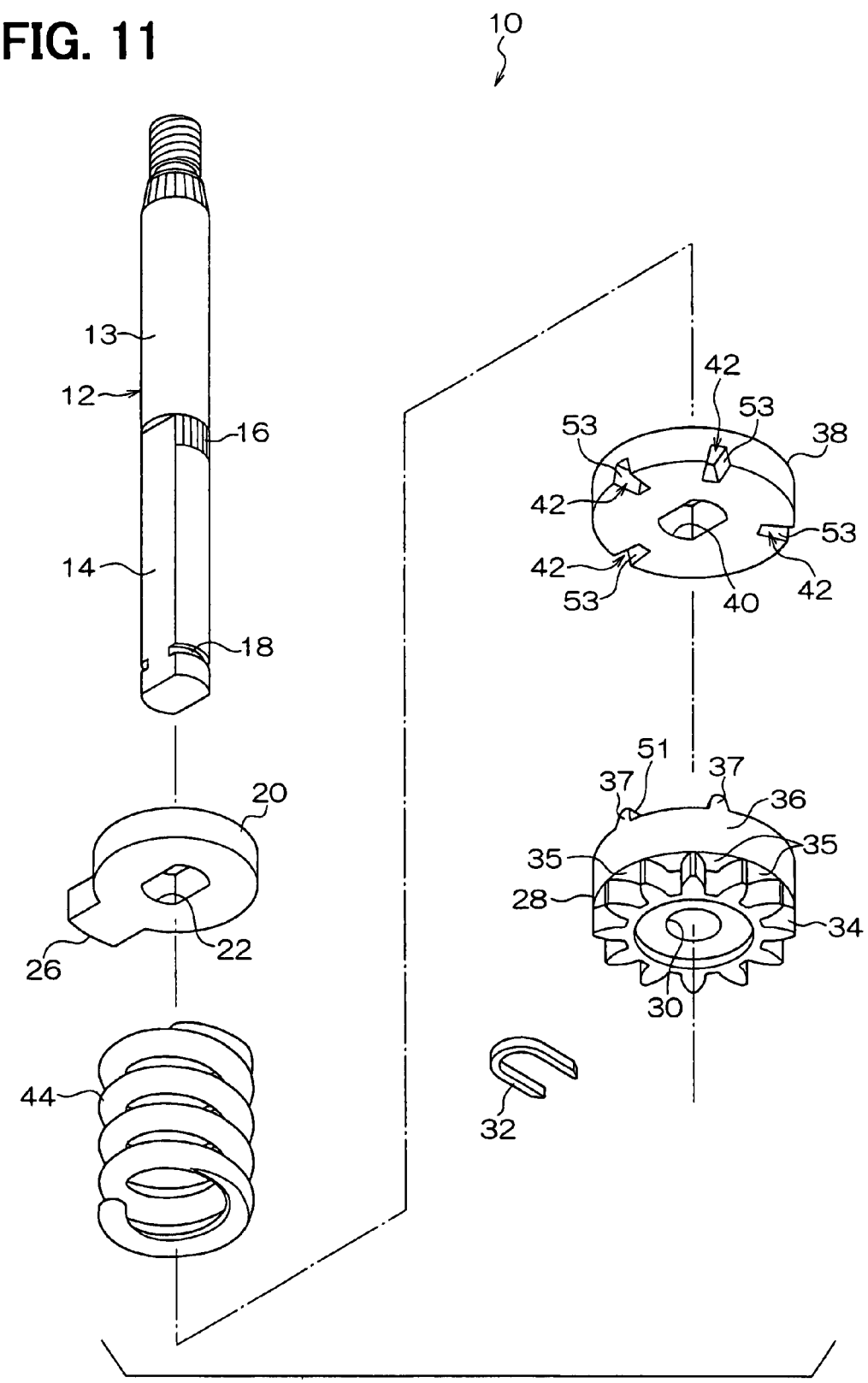
FIG. 11 is another exploded perspective view of the clutch mechanism of the wiper motor according to the first embodiment.

As shown in FIGS. 10, 11, the clutch mechanism 10 in the first embodiment principally includes the output shaft 12, an engagement base 20, a coil spring 44, which serves as a biasing means, a clutch disk 38 and the input disk 28. The engagement base 20, the coil spring 44, the clutch disk 38 and the input disk 28 serve as the clutch mechanism 10.

A leading end-side portion of the output shaft 12, that is, an upper portion of the output shaft 12 in FIG. 10 is a cylindrical column portion 13, which has a round cross-sectional profile. A base end-side portion of the output shaft 12, that is, a lower portion of the output shaft 12 in FIG. 10 is a relative rotation preventing portion 14, which has a generally rectangular "double D-cut" sectional profile. Specifically, the relative rotation preventing portion 14 has a pair of flat surfaces, which are arranged at 180 degrees from each other in a circumferential direction, and a pair of curved surfaces, which are continuously shaped to the flat surfaces.

Figure 6:
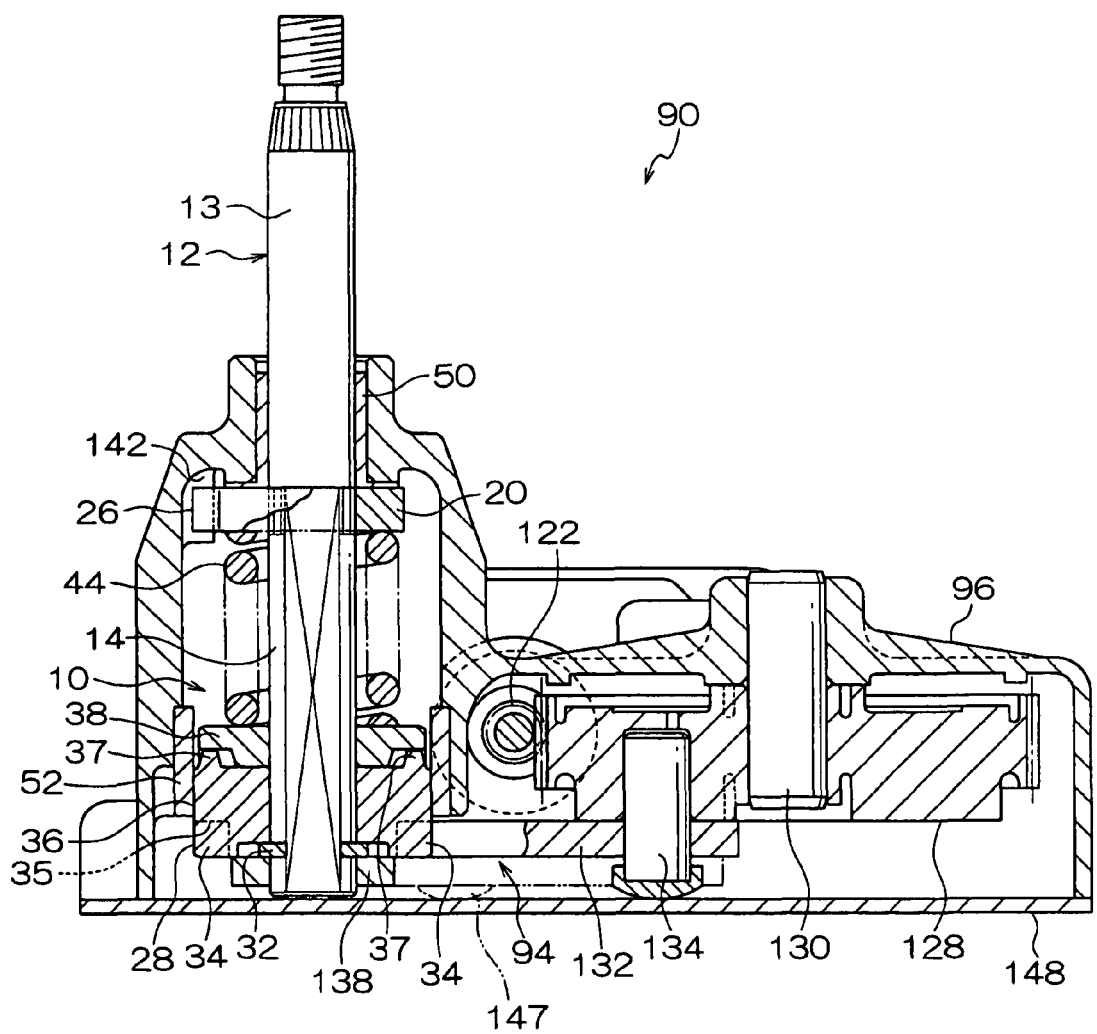
FIG. 6 is another cross-sectional view showing the wiper motor according to the first embodiment, which is taken along line VI-VI in FIG. 5.
Figure 7:
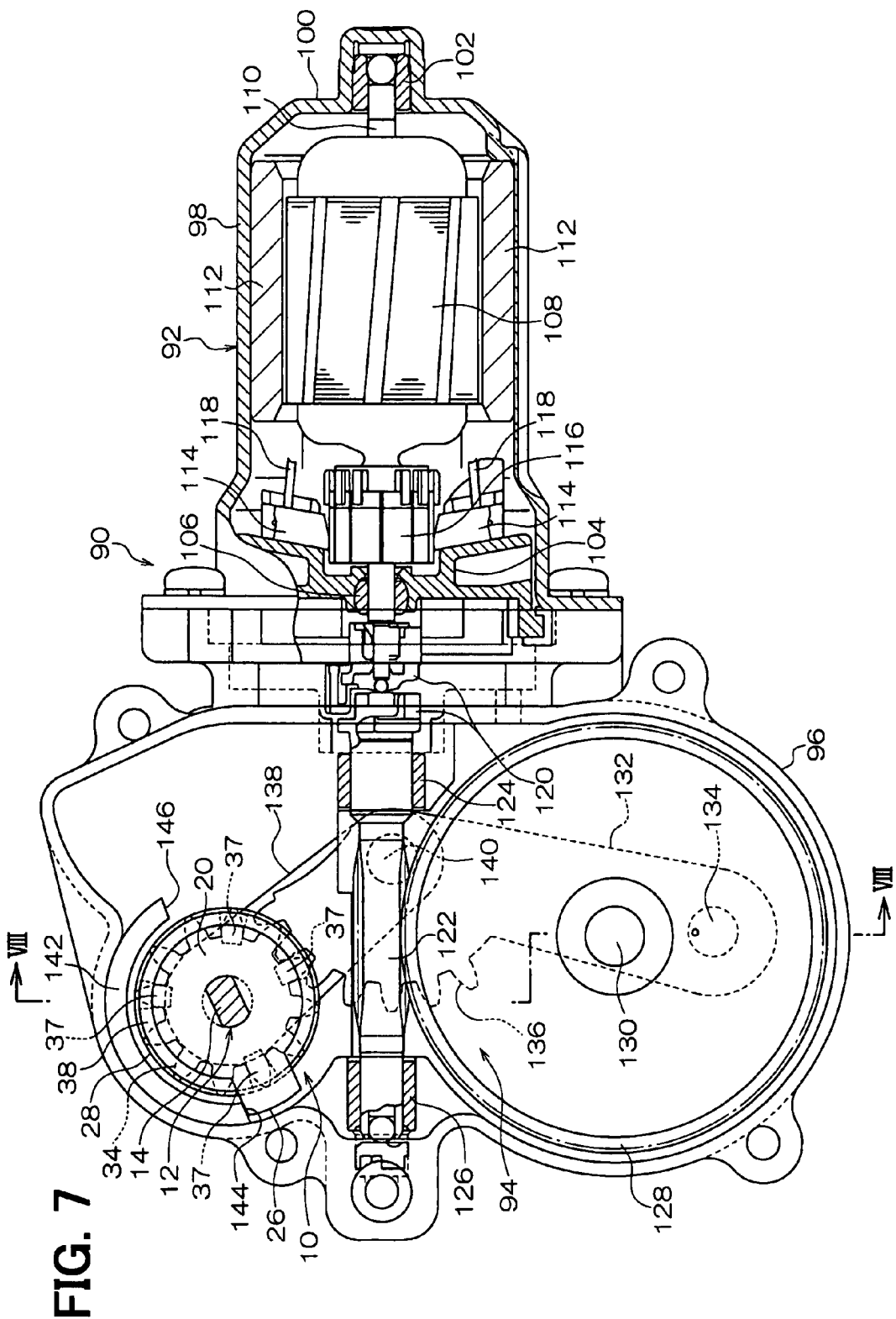
FIG. 7 is another cross-sectional view showing the wiper motor according to the first embodiment.

The cylindrical column portion 13 of the output shaft 12 is rotatably supported by a bearing part 50, which is fixed on the housing 96, as shown in FIG. 6. The relative rotation preventing portion 14 is provided with a rotation stopping portion 16 in the leading end-side portion, i.e., in the vicinity of the cylindrical column portion 13, and is provided with a drop-off stopping portion 18 in the base end-side portion. The rotation stopping portion 16 is a set of rib lines that are arranged on the circumferential surface side-by-side over the circumference so that the rib lines are in parallel with the axial direction respectively. The drop-off stopping portion 18 is shallow grooves that extend on the circumferential surface in a direction approximately perpendicular to the output shaft 12.

In the first embodiment, the clutch mechanism 10 is assembled by installing the engagement base 20, the coil spring 44, the clutch disk 38 and the input disk 28 in this order onto the relative rotation preventing portion 14 on the base end portion side of the output shaft 12 and by attaching a drop-off stopping clip 32 on the drop-off stopping portion. Thus, the clutch mechanism 10 can be handled as an assembly.

The engagement base 20 is a disk-like part. A support hole 22 is formed on a center portion of the engagement base 20. A stopper portion 26 protrudes on a circumference of the engagement base 20 in the radial direction of the engagement base 20, i.e., in the radial direction of the output shaft 12. The support hole 22 has a generally rectangular "double D-cut" sectional profile so as to fit to the relative rotation preventing portion 14 of the output shaft 12.

The engagement base 20 serves as a large diameter portion that has a larger diameter in the radial direction of the output shaft 12. The output shaft 12 is inserted into the support hole 22 so that the engagement base 20 is coaxially fixed to the output shaft 12. Thus, the engagement base 20 does not move in the axial direction with respect to the output shaft 12 and rotates integrally with the output shaft 12.

In the first embodiment, the output shaft 12 and the engagement base 20 are formed separately from each other and fixed integrally to each other, however, it is also possible to form the output shaft 12 and the engagement base 20 integrally by cold forging and the like, i.e., so that the output shaft 12 has a construction with a flange-like large diameter portion integrally formed thereon.

In the first embodiment, the housing 96 is provided with an arc-shaped stopper projection 142 as shown in FIGS. 5-8, etc. The stopper projection extends along an extension line of a trail circle of the stopper portion 26. Thus, each of one and the other end portions of the stopper projection 142 serve as rotation limiting portions 144, 146. That is, each of the rotation limiting portions 144, 146 of the stopper projection 142 are provided to come in contact with the stopper portion 26. When the stopper portion 26 comes in contact with either one of the rotation limiting portions 144, 146, the engagement base 20 is prevented from rotating further.

In this manner, the stopper projection 142 limits a rotation range of the engagement base 20, so that the swing range of the wiper 200 is limited within a predetermined angular range.

The clutch disk 38 is a disk-like part. A shaft hole 40 with a generally rectangular cross-sectional profile ("double-D" cross-sectional profile) is formed on a center portion of the clutch disk 38 so as to fit the relative rotation restricting portion 14. A stopper portion 26 protrudes on a circumference of the engagement base 20 in the radial direction of the engagement base 20, i.e., in the radial direction of the output shaft 12. In the first embodiment, the clutch disk 38 is a sintered metal part that is formed by "powder metallurgy process" by which powdered metal is put in a metal die, molded with pressure and sintered by heating. Lubricant oil is impregnated in the sintered metal of the clutch disk 38.

The output shaft 12, specifically the relative rotation restricting portion 14 is inserted in the shaft hole 40 of the clutch disk 38. Thus, the clutch disk 38 is prevented from rotating about the center axis of the output shaft 12, that is, the clutch disk 38 rotates integrally with the output shaft 12 at all times, and is able to move along an axial direction of the output shaft 12.

A peripheral portion of the clutch disk 38 is provided with four engaging depressions 42 on its rear surface, i.e., a surface closer to the input disk 28. These four engaging depressions 42 correspond to four engaging protrusions 37 of the input disk 28 that is described hereafter.

In the first embodiment, the four engaging depressions 42 are aligned coaxially with the clutch disk 38. Further, the engaging depressions 42 are arranged irregularly along a circumferential direction of the clutch disk 38, that is, so as to provide intervals between the engaging depressions 42 irregularly.

The engaging depressions 42 are shaped to have a generally trapezoidal cross-sectional profile so that an inner width of each engaging depression 42 along the circumferential direction of the clutch disk 38 gradually extends as coming closer to its opening, i.e., to the rear surface of the clutch disk 38. Thus, both sidewalls 53 of each engaging depression 42 are inclined by a predetermined angle to the rear surface of the clutch disk 38.

An upper end portion of the coil spring 44 is in contact with a lower surface (rear surface) of the engagement base 20, and a lower end portion of the coil spring 44 is in contact with an upper surface (front surface) of the clutch disk 38. Thus, the coil spring 44 biases the clutch disk 38 downward with respect to the engagement base 20 in the axial direction of the output shaft 12, that is, away from the engagement base 20 onto the input disk 28. Thus, the coil spring 44 pushes the clutch disk 38 onto the input disk 28 so as not to release an engagement between the engaging protrusions 37 of the input disk 28 and the engaging depressions 42 of the clutch disk 38 while a torque acting between the input disk 28 and the clutch disk 38 is smaller than a predetermined value, as described hereafter in detail.

Even when the engaging protrusions 37 are pulled out of the engaging depressions 42 and the engagement is released, biasing force of the coil spring 44 still pushes the engaging protrusions 37 onto the rear surface of the clutch disk 38, to generate a predetermined friction force therebetween. Thus, even when the engagement is released, the input disk 28 and the clutch disk 38 are configured to rotate together in certain conditions.

The engagement between the input disk 28 and the clutch disk 38 is held by using the coil spring 44 in the first embodiment, however, the present invention is not limited to this construction. For example, it is possible to use other biasing means such as a wave washer, a leaf spring, a rubber member, etc. It is also possible to configure the input disk 28 and the clutch disk 38 to draw each other by means of magnetic force.

In the first embodiment, even in a normal operational state (engaging state) in which the clutch disk 38 remains still without start moving toward the engagement base 20, the coil spring 44 already biases the clutch disk 38 onto the input disk 28. The present invention is not limited to this construction. For example, another construction is possible in which the coil spring 44 biases the clutch disk 38 only when the clutch disk 38 is displaced toward the engagement base 20 and the engagement between the input disk 28 and the clutch disk 38 is about to be released.

The input disk 28 is a disk-like part. A shaft hole 30 with a generally round cross-sectional profile is formed on a center portion of the input disk 28. Substantially as same as the clutch disk 38, the input disk 28 is a sintered metal part that is formed by "powder metallurgy process" by which powdered metal is put in a metal die, molded with pressure and sintered by heating. Lubricant oil is impregnated in the sintered metal of the input disk 28.

The output shaft 12 is coaxially inserted into the shaft hole 30 of the input disk 28. Thus, the input disk 28 is rotatably supported by the output shaft 12. Further, a circumferential surface 36 of the input disk 28, which is coaxial with the output shaft 12 and has a larger diameter than a gear portion 34, is rotatably supported by a bearing part 52 that is fixed on the housing 96 as shown in FIG. 6, etc.

A peripheral portion of the input disk 28 is provided with four engaging protrusions 37 on its front surface, i.e., a surface closer to the engagement base 20.

The four engaging protrusions 37 are aligned coaxially with the input disk 28. Further, the engaging protrusions 37 are arranged irregularly along a circumferential direction of the input disk 28, that is, so as to provide intervals between the engaging protrusions 37 irregularly. As described above, these four engaging protrusions 37 correspond to the four engaging depressions 42 of the clutch disk 38. The engaging protrusions 37 fit in the engaging depressions 42 only when the input disk 28 and the clutch disk 38 are in a predetermined relative angle.

The engaging protrusions 37 are shaped to have a generally trapezoidal cross-sectional profile so that a width of each engaging protrusion 37 along the circumferential direction of the input disk 28 is gradually narrowed as coming closer to its top end. Thus, both sidewalls 51 of each engaging depression 42 are inclined by a predetermined angle.

On an outer circumference on a rear surface-side of the input disk 28 is formed the gear portion 34. The gear portion 34 is engaged with the sector gear 132. Thus, when driving force is inputted from the sector gear 132, the input disk 28 rotates about the output shaft 12. At this moment, if the engaging protrusions 37 are fitted in the engaging depressions 42, rotational force of the input disk 28 is transmitted to the clutch disk 38, so that the input disk 28 and the clutch disk 38 interlocks and rotates together.

On the rear surface of the input disk 28 are formed connection walls 35 that are contiguous to top end (engagement base-side end) of the gear portion 34 in the axial direction. The connection walls 35 and the support lever 138 hold both sides of the gear cogs 136 of the sector gear 132 therebetween. That is, the connection walls 35 and the sector lever 138 face each other in a thickness direction of the gear cogs 136, so as to sandwich the gear cogs 136 therebetween. Thus, the gear cogs 136 are prevented from moving in their thickness direction.

In the first embodiment, the engaging protrusions 37 of the input disk 28 and the engaging depressions 42 of the clutch disk 38 are engaged with each other only when the input disk 28 and the clutch disk 38 are in the predetermined relative angle as described above. That is, even if one engaging protrusion 37 is in alignment with one engaging depression 42, the other three protrusions 37 are not in alignment with the other three engaging depressions 42, when the input disk 28 and the clutch disk 38 are not in the predetermined relative angle. Thus, in a released state in which the engaging protrusions 37 are out of the engaging depressions 42, the clutch disk 38 is in contact with the input disk 28 at three engaging protrusions 37 at minimum, that is, the clutch disk 38 is in three-point support state.

Accordingly, in a case the output shaft 12 is subjected to a torque larger than the engagement releasing torque to work the clutch mechanism 10 and the engagement between the input disk 28 and the clutch disk 38 is once released as described hereafter, the engaging protrusions 37 of the input disk 28 fits again only to their corresponding engaging depressions 42 of the clutch disk 38 by operating the wiper motor 90 again after the engagement releasing torque is removed. Thus, the input disk 28 and the clutch disk 38 return to their home position. In this manner, wiper motor 90 in the first embodiment automatically returns a relative position of an input side and an output side of the clutch mechanism 10, i.e., a relative position of the worm wheel 128 and the wiper 200, and then performs its normal operation.

Figure 12A:
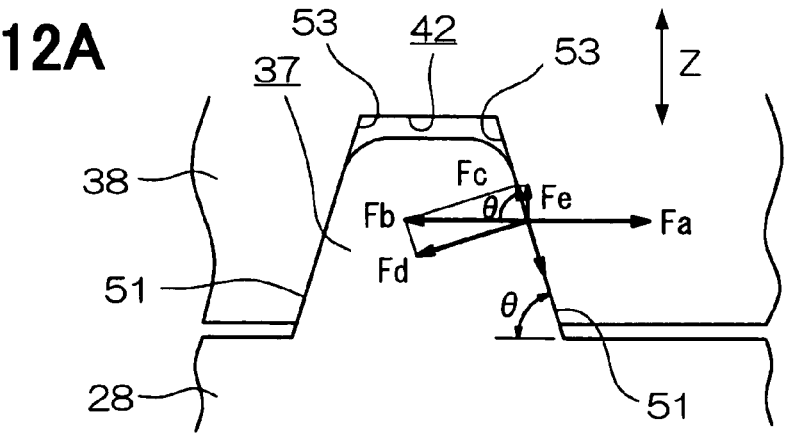
FIG. 12A is an explanatory view showing an engaging state of the clutch mechanism of the wiper motor according to the first embodiment.

FIG. 12A schematically depicts the engaging state in which the engaging protrusion 37 and the engaging depression 42 are engaged with each other during the normal operation of the wiper motor 90. In the following explanation referring to FIGS. 12A, 12B, friction force between the input disk 28 and the clutch disk 38 is not taken into account for the sake of simplicity.

As described above, in the first embodiment, the engaging protrusions 37 and the engaging depressions 42 are aligned along the circumferential direction of the input disk 28 and the clutch disk 38. The sidewalls 51 of the engaging protrusions 37 and the sidewalls 53 of the engaging depressions 42 are inclined by an angle of θ degrees with respect to a flatness direction of the input disk 28 and the clutch disk 38, i.e., by an angle of (90-θ) with respect to the axial direction of the output shaft 12, which is indicated by arrow Z in FIGS. 12A, 12B.

When the input disk 28 starts rotating rightward in the FIG. 12A in the engaging state in which the engaging protrusions 37 and the engaging depressions 42 are engaged with each other, the engaging protrusion 37 of the input disk 28 applies a rotation transmitting force Fa onto the engaging depression 42 of the clutch disk 38. The engaging protrusion of the clutch disk 38 is subjected to a reaction force Fb in an opposite direction from the rotation transmitting force Fa. The reaction force Fb can be divided into a component force Fc (Fc=Fb·cos θ), which is in parallel to a surface of the sidewall 53 and perpendicular to a radial direction of the clutch disk 38, and a component force Fd, which is perpendicular to the surface of the sidewall 53 of the clutch disk 38. Then, the clutch disk 38 is subjected to an engagement releasing force Fe (Fe=Fc·sin θ=Fb·cos θ·sin θ), which is a component of the component force Fc and in parallel to the axial direction of the output shaft 12.

However, the component force Fe is smaller than a downward biasing force applied onto the clutch disk 38 by the coil spring 44. Thus, the clutch disk 38 does not slide with respect to the input disk 28 in an inclination direction of the sidewall 51 (53), and the clutch disk 38 interlocks with and rotates together with the input disk 28.

The clutch mechanism 10 of the present invention is not limited to the above-described construction in which every sidewall 51, 53 of the engaging protrusions 37 of the input disk 28 and the engaging depressions 42 of the clutch disk 38 is inclined. Alternatively, it is possible to configure the clutch mechanism 10 by forming at least one of the protrusion of the input disk and the depression of the clutch disk with the sidewall with inclination. In this case also, it is possible to let the rotation transmitting force Fa, which transmits from the input disk 28 to the clutch disk 38, apply a component force onto the clutch disk 38 in the axial direction of the output shaft 12.

Figure 12B:
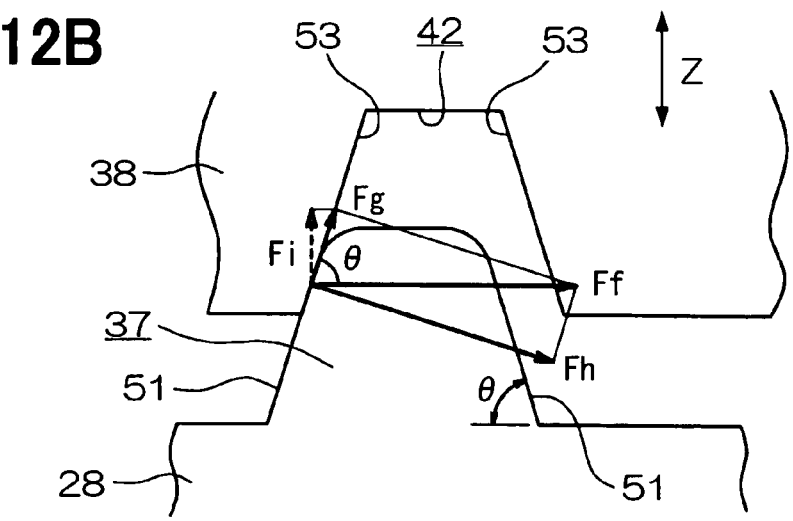
FIG. 12B is another explanatory view showing a transition from the engaging state to a released state of the clutch mechanism of the wiper motor according to the first embodiment.

FIG. 12B schematically depicts a state in which the output shaft 12 is subjected to an excessively large external force (load), and the engaging protrusion 37 and the engaging depression 42 are going to be released from each other, that is, the clutch mechanism 10 is in a transition from the engaging state to the released state.

In the first embodiment, the clutch mechanism 10 is configured so that the engagement between the engaging protrusions 37 and the engaging depressions 42 is released when the output shaft 12 is subjected to a torque larger than the engagement releasing torque.

If the output shaft 12 is subjected to the excessively large external force when the clutch mechanism 10 is in the engaging state, rotational force acts onto the clutch disk 38. FIG. 12B illustrates a state that the rotational force acts in a direction to rotate the clutch disk 38 rightward. When the clutch disk 38 is subjected to the rotational force in this manner, a rotational driving force Ff acts onto the input disk 28 due to the engagement between the engaging protrusion 37 and the engaging depression 42. The rotational driving force Ff can be divided into a component force Fg (Fg=Ff·cos θ), which is in parallel to the surface of the sidewall 53 and perpendicular to the radial direction of the clutch disk 38, and a component force Fh, which is perpendicular to the surface of the sidewall 53 of the clutch disk 38. Then, the clutch disk 38 is subjected to an engagement-releasing force Fi (Fi=Fg·sin θ=Ff·cos θ·sin θ), which is a component of the component force Fg and in parallel to the axial direction of the output shaft 12.

If the component force Fi exceeds the predetermined value that corresponds to a biasing force of the coil spring 44 in the above-described state, the clutch disk 38 moves upward against the biasing force of the coil spring 44 as shown in FIG. 12B. The engaging protrusions 37 is pulled out of the engaging depressions 42 in this manner, and the clutch mechanism 10 is shifted into the released state shown in FIGS. 14, 15, etc.

When the clutch mechanism 10 is in the released state, the clutch disk 38 and the output shaft 12 rotates idle with respect to the input disk 28.

As shown in FIG. 12B, the component force Fi, which pushes the clutch disk 38 to be released from the input disk 28, can be adjusted in accordance with a magnitude of the angle e by which the sidewalls 51, 53 are inclined.

In the first embodiment, the clutch mechanism 10 is configured so that the engagement releasing torque to shift the clutch mechanism 10 from the engaging state to the released state falls within a certain range of value. If the engagement releasing torque is too small, the clutch mechanism 10 frequently shifts into the released state during the normal operation of the wiper apparatus W. The frequent release of the clutch mechanism 10 can cause passenger's discomfort, an abnormal operation of the wiper apparatus W unable to wipe the windshield glass 3 normally, and other glitches. If the engagement releasing torque is too large, the clutch mechanism 10 remains in the engaging state even when it should be shifted into the released state. Thus, too large engagement torque can cause breakages of the internal mechanisms of the wiper motor 90, i.e., the swing mechanism 94, the motor body 92, etc.

Figure 13:
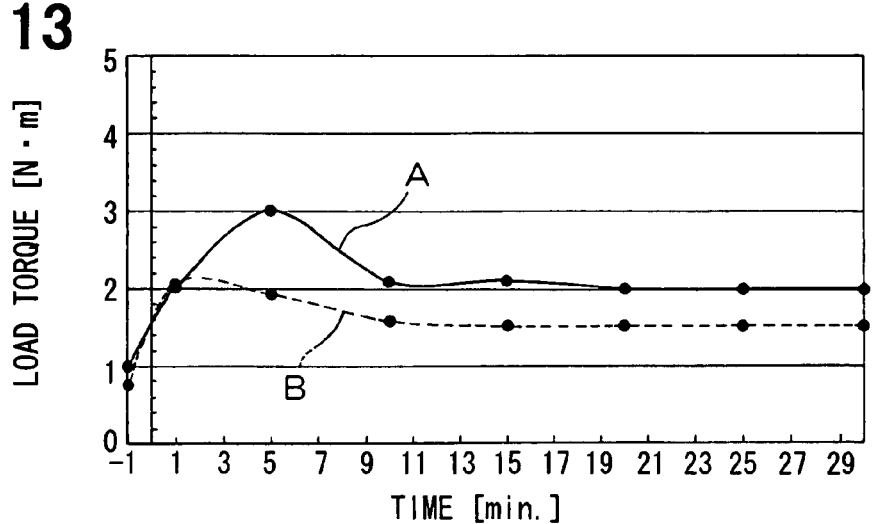
FIG. 13 is a graph showing a variation of a wiping load that acts on an output shaft of the wiper motor according to the first embodiment.

FIG. 13 depicts a change of the wiping load torque with respect of to time, which is obtained by actual measurement in predetermined two conditions in which the torque is applied onto the output shaft 12 of the wiper apparatuses W installed on two models of vehicle. In these two measurements, a window washer stops spraying washer liquid onto the windshield glass 3 at time zero in the graph of FIG. 13. Lines A, B in the graph correspond to the two models of vehicle. In the measurements, the wiper blade 202 of the wiper apparatus W has a relatively long blade length of approximately 50 cm.

As shown in FIG. 13, the wiping load torque is as small as 1 N·m in both of the two measurements while the windshield glass 3 is wet. The wiping load torque increases up to 2-3 N·m while the windshield glass 3 is semidry in a time range several minutes after the wind washer is stopped. That is, the wiping load torque rises to a maximum value while the windshield glass is in the semidry condition. Thus, the wiping load torque acting onto the output shaft 12 rises to the maximum value right after the vehicle runs into a tunnel in traveling under raining weather condition.

In the first embodiment, the above-mentioned engagement releasing torque is configured not to work the clutch mechanism 10 into the released state when the wiping load torque changes within the engagement releasing torque. Specifically, the engagement releasing torque is larger than the maximum wiping load torque when the output shaft 12 is subjected to the external force corresponding to the maximum wiping load acting on the wiper blade 202 during to-and-fro wiping operation of the wiper apparatus W. The engagement releasing torque is set to a value larger than 3 N·m in the first embodiment. Further, the engagement releasing torque in the first embodiment is configured in view of a variation of the external force due to possible driving wind during the wiping operation, in addition to the wiping load torque. Thus, at least the minimum value of the engagement releasing torque is set to a value larger than 3.5 N·m in the first embodiment. In this manner, it is possible to prevent the clutch mechanism 10 from working during a normal operation of the wiper apparatus W.

Furthermore, the engagement releasing torque is set to a value smaller than a motor breakage torque (motor's resistance torque), that is, smaller than a value to break any one of the elements constituting the swing mechanism 94 and the motor body 92 when the output shaft 12 is rotated on a condition that the rotation axis 110 of the motor body 92 is locked.

In the first embodiment, the worm wheel 128 is made of resin. Thus, cogs of the worm wheel 128 engaged with the worm gear 122 is most prone to breakage. Accordingly, the engagement releasing torque in the first embodiment is set to a value smaller than the motor breakage torque to break the worm wheel 128. The engagement releasing torque is set to a value smaller than approximately 20 N·m in the first embodiment. That is, the maximum value of the engagement releasing torque is smaller than the motor breakage torque. In this manner, the wiper motor 90 of the first embodiment can protect its internal mechanisms by working the clutch mechanism 10 with reliability before the internal mechanisms are broken when the output shaft 12 is subjected to the excessively large external force.

Still further, the engagement releasing torque in the first embodiment is set to a value larger than the maximum output torque of the wiper motor 90, that is, larger than a value that the wiper motor 90 outputs on a condition that the output shaft 12 is locked and the motor body 92 produces its maximum output. The engagement releasing torque is set to a value larger than 10 N·m in the first embodiment.

If the engagement releasing torque is smaller than the maximum output torque of the wiper motor 90, the swing mechanism 94 and the motor body 92 in the wiper motor 90 keep operating in generating their operating noises when the wiper apparatus W is turned on under a condition that the wiper 200 is locked on the surface of the windshield glass 3 by accumulated snow and/or frozen ice. Thus, the engagement releasing torque smaller than the maximum output torque of the wiper motor 90 can cause passenger's discomfort. The maximum output torque of the wiper motor 90 is naturally set to a value smaller than the above-mentioned motor breakage torque to prevent breakage of the wiper motor 90.

As a result of setting the motor breakage torque to a value larger than the maximum output torque of the wiper motor 90 as in the first embodiment, the clutch mechanism 10 maintains the engaging state without shifting into the released state on the condition that the wiper is locked, and the clutch mechanism 10 works to shift into the released state only when the output shaft 12 is subjected to the excessively large external force larger than the maximum motor output torque. In this manner, the wiper motor 90 can prevent frequent release of the clutch mechanism 10 so as not to generate undesired operating noise. In addition, it is possible to decrease a magnitude of required durability of the clutch mechanism 10 in designing the wiper motor 90, in accordance with the decrease of the working frequency of the clutch mechanism 10.

The wiper motor 90 in the first embodiment has usefulness in adjusting the releasing torque of the clutch mechanism 10 by designing the engagement base 20 fixed on the output shaft 12, the coil spring 44, the clutch disk 38 and the input disk 28.

That is, the force by which the clutch disk 38 is displaced in its axial direction can be easily changed by adequately adjusting the inclination angle e of the sidewalls 51, 53 of the engaging protrusions 37 of the input disk 28 and the engaging depressions 42 of the clutch disk 38, the number of the engaging protrusions 37 and the engaging depressions 42, a frictional coefficient due to a surface roughness, lubricant oil and the like, a spring coefficient of the coil spring 44, and other factors.

For example, when the inclination angle θ (refer to FIGS. 12A, 12B) of the sidewalls 51, 53 of the engaging protrusions 37 and the engaging depressions 42 is set to 45 degrees, the component force Fi is maximized, and the clutch mechanism 10 is most easily released. By adequately adjusting the inclination angle θ in this manner, the engagement releasing force (engagement releasing torque) is set to desired value.

In the following is described an operation of the wiper motor 90 according to the first embodiment.

Figure 9:
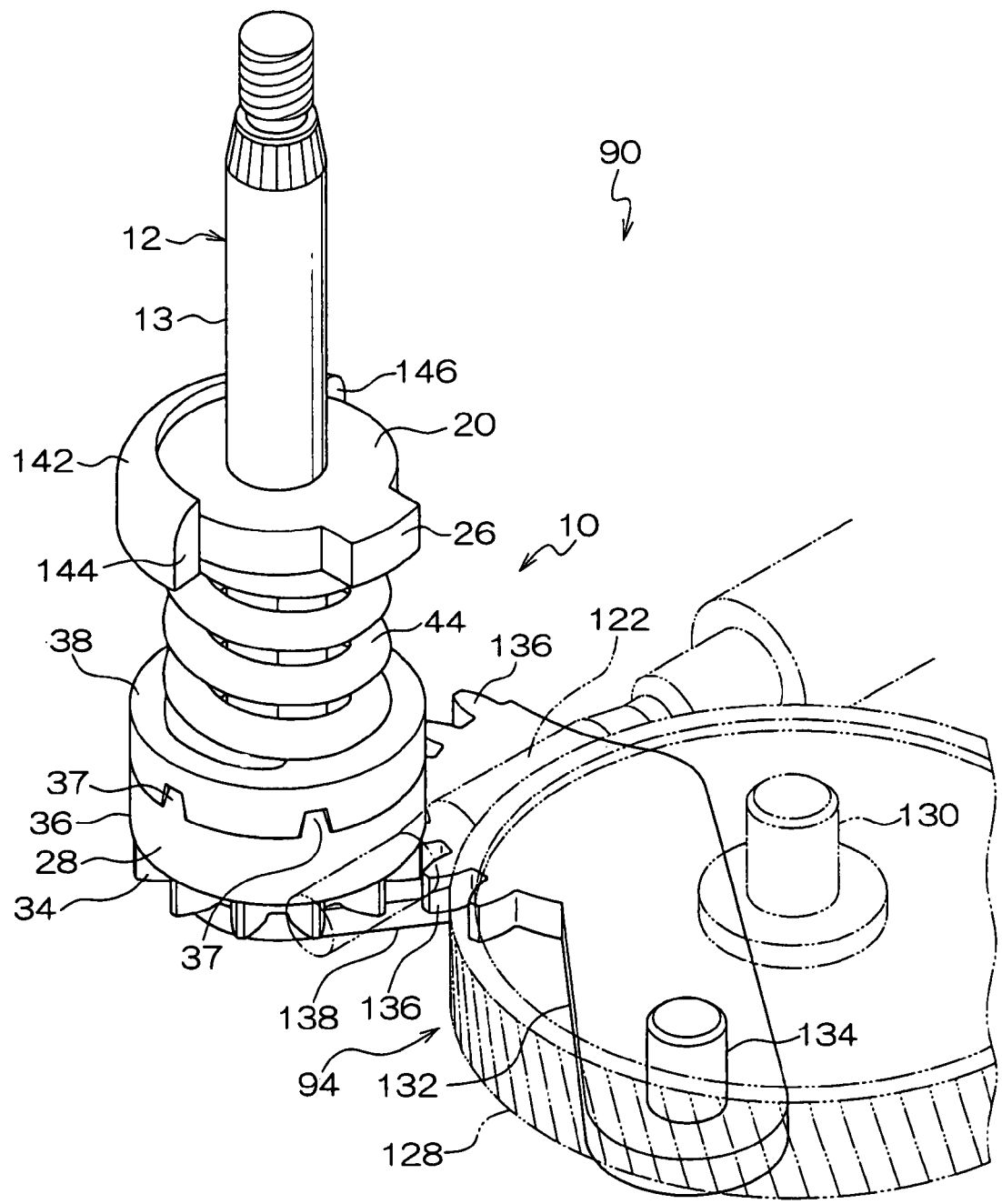
FIG. 9 is a close-up perspective view showing an engaging state of a clutch mechanism of the wiper motor according to the first embodiment.

In the wiper motor 90 according to the first embodiment, the clutch mechanism 10 is kept in the engaging state during the normal operation, as shown in FIGS. 6, 8, 9, etc. That is, the coil spring 44 biases the clutch disk 38 onto the input disk 28, so as to maintain an engagement between the engaging protrusions 37 of the input disk 28 and the engaging depressions 42 of the clutch disk 38.

The wiper motor 90 according to the first embodiment is designed so that (the armature 108 of) the motor body 92 rotates only in one rotational direction. The worm gear 122 transmits rotational force to the worm wheel 128 while the motor body 92 rotates. Then, the sector gear 132, which is coupled to the worm wheel 128, swings to and fro in accordance with the rotation of the worm wheel 128. Further, the input disk 28 rotates to and fro, in accordance with the to-and-fro swing motion of the sector gear 132.

When the input disk 28 rotates to and fro, the engagement between the engaging protrusions 37 and the engaging depressions 42 transmits rotational driving force from the input disk 28 to the clutch disk 38. The clutch disk 38 is fixed on and integrally rotates with the output shaft 12, the rotational driving force, which is transmitted to the clutch disk 38, is further transmitted from the clutch disk 38 to the output shaft 12. Thus, the output shaft 12 rotates to and fro together with the clutch disk 38 and with the input disk 28.

As a result, the wiper 200 fixed on the output shaft 12 wipes the surface of the windshield glass 3 to and fro, in accordance with the to-and-fro rotation of the output shaft 12.

When the wiper 200 applies excessively large external force (load) onto the output shaft 12, the output shaft 12 rotates in a reverse direction or kept being locked. The excessively large external force applies rotational force onto the clutch disk 38, which rotates integrally with the output shaft 12, to rotate the clutch disk 38 relative to the input disk 28.

Figure 14:
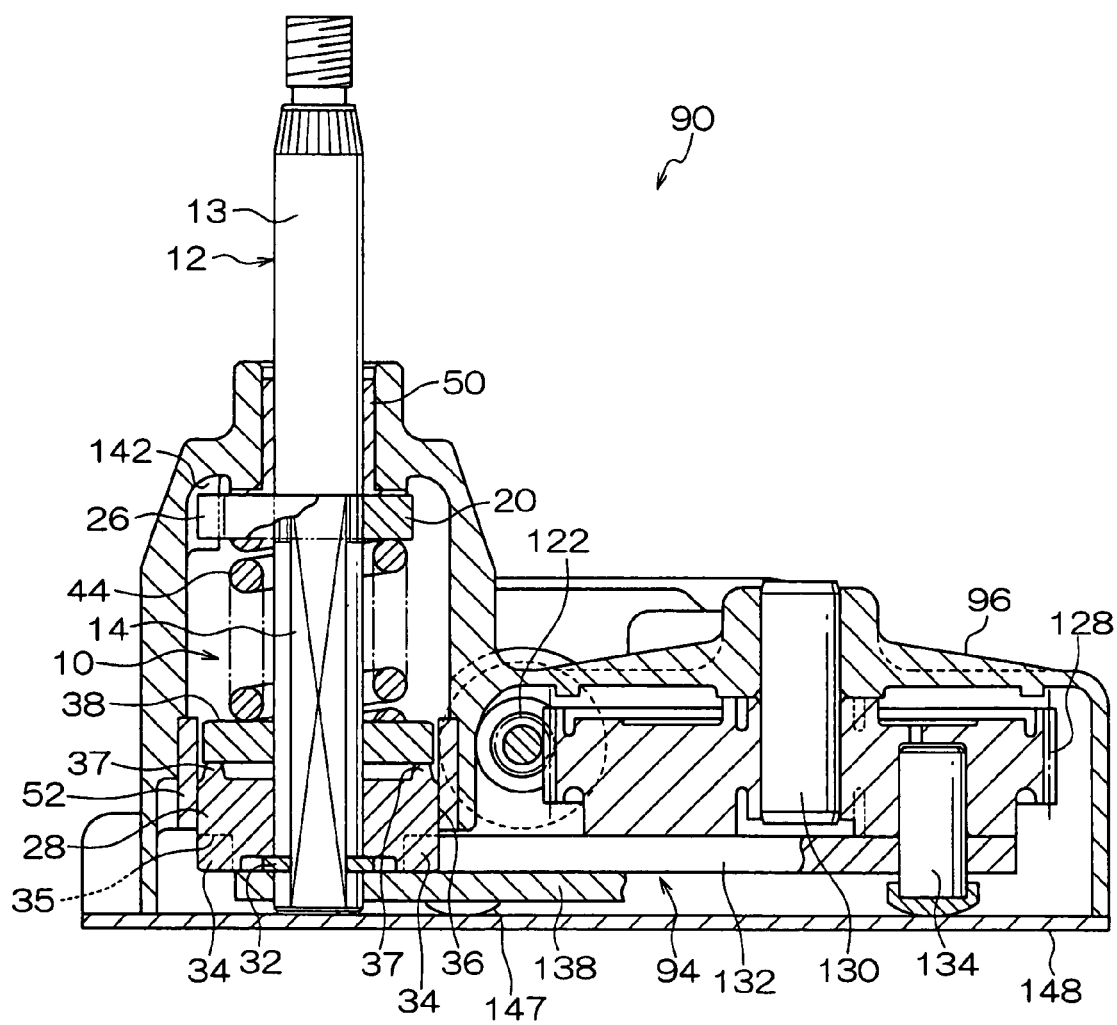
FIG. 14 is another cross-sectional view showing the wiper motor according to the first embodiment, in which the clutch mechanism is in the released state.
Figure 15:
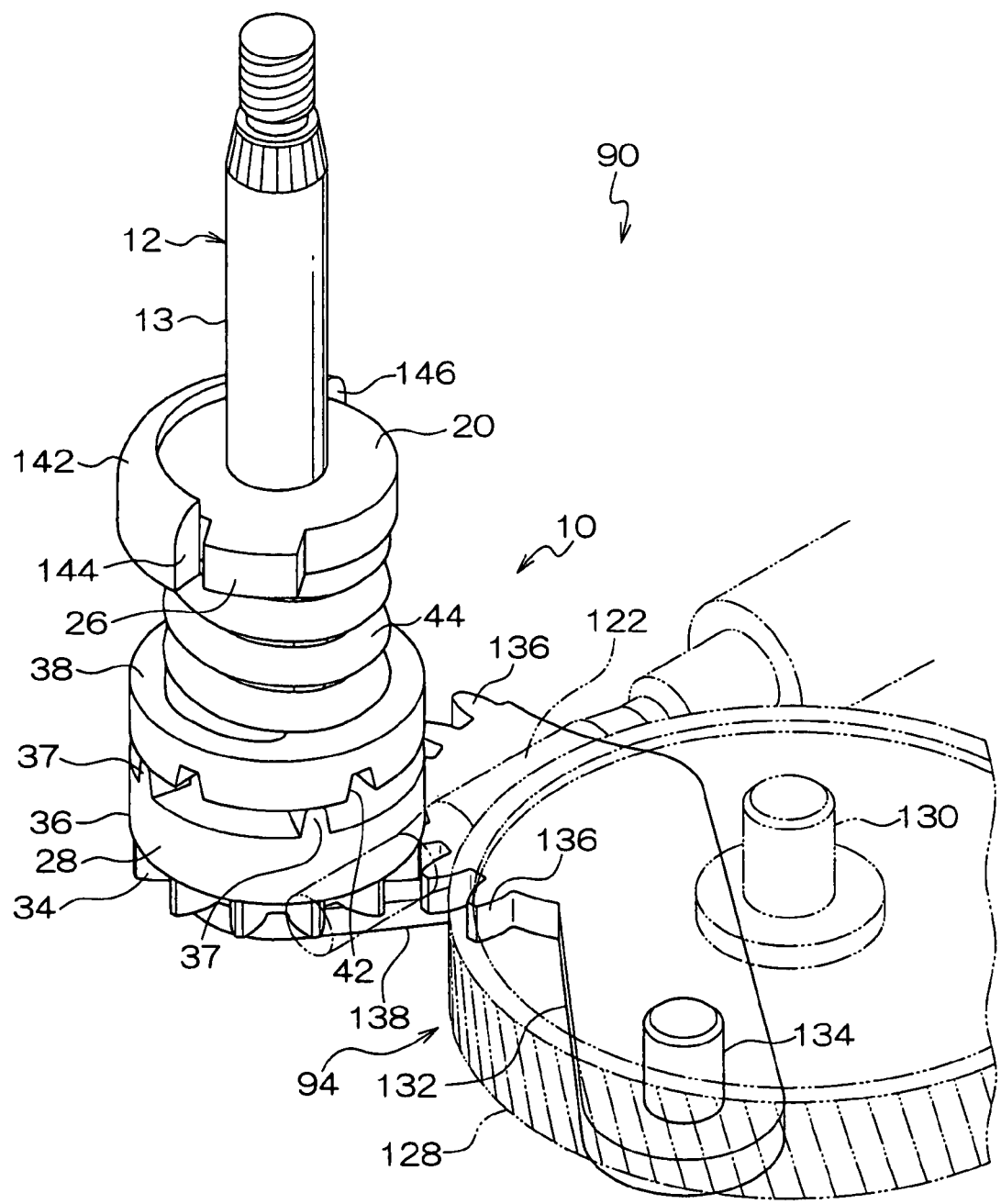
FIG. 15 is another close-up perspective view showing the released state of the clutch mechanism of the wiper motor according to the first embodiment.

If the torque acting on the output shaft 12 exceeds the predetermined engagement releasing torque as described above, the clutch disk 38 moves upward in accordance with the rotation of the output shaft 12, so as to pull the engaging protrusions 37 out of the engaging depressions 42 and to release the engaging state, as shown in FIGS. 14, 15. The clutch disk 38 and output shaft 12 rotate idle with respect to the input disk 28, by the release of the engagement.

The idle rotation of the output shaft 12 can prevent breakage of each part of the swing mechanism 94 including parts of the clutch mechanisms 10, the sector gear 132 coupled to the input disk 28, the support lever 138, the worm wheel 128, and others. Accordingly, it is unnecessary to set strength of each part of the wiper motor 90 in view of the action of the excessively large external force (load). The decrease of the design strength of each part serves for decreasing the weight of the wiper motor 90.

Accordingly, the wiper motor 90 of the first embodiment is useful for installing on vehicles (such as trucks and construction machines having a cabover driver's seat/cockpit) with a large possibility that the wiper 200 applies the excessively large external force (load) onto the output shaft 12 in such a case that snow accumulated on the roof of the vehicle drops approximately vertically and directly hits on the wiper 200 to apply large external force on the wiper motor 90.

In the following is described a wiper motor 150 according to a second embodiment of the present invention. In the following description, substantially the same component as in the above-described first embodiment is respectively assigned the same referential numeral/character as in the first embodiment, and not described redundantly.

Figure 16:
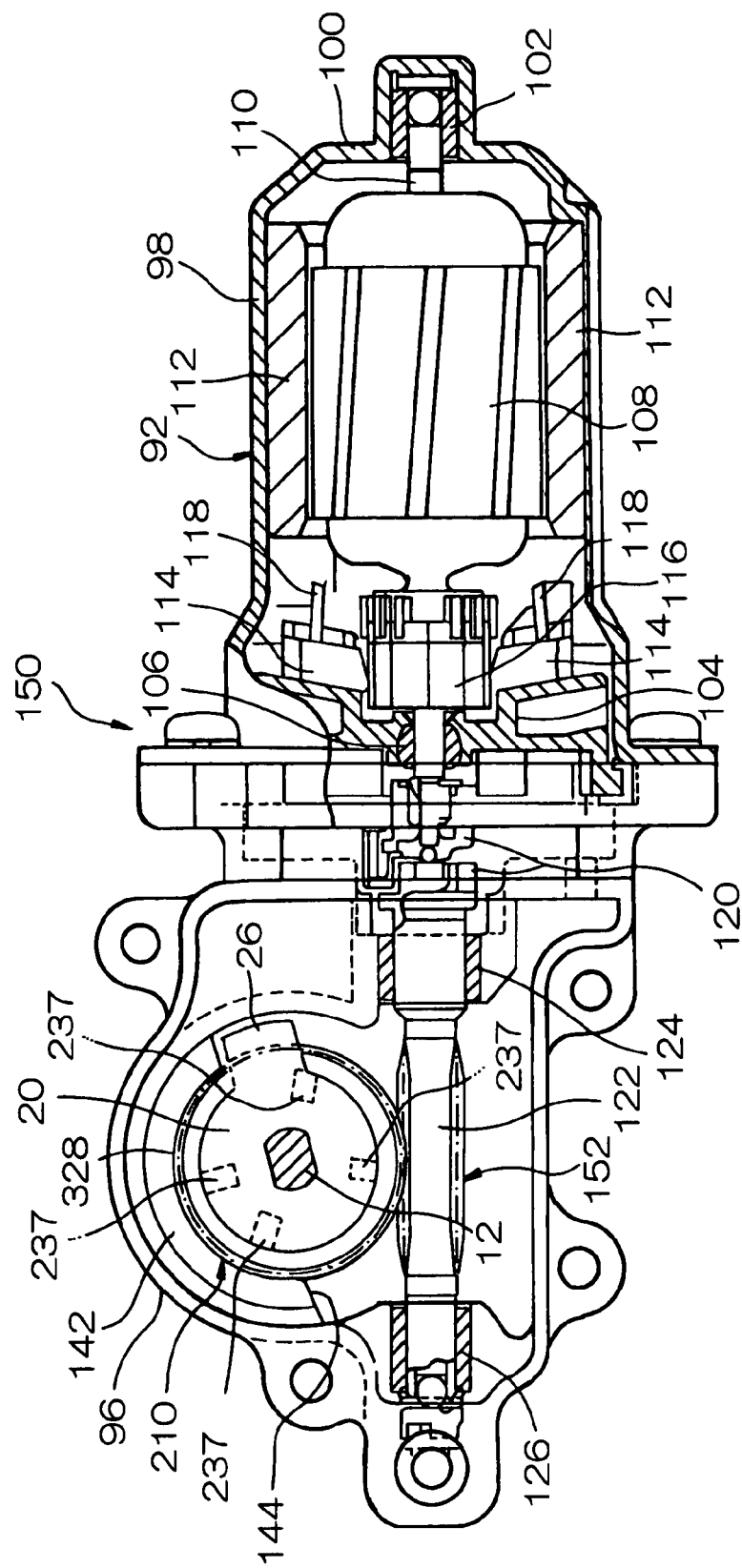
FIG. 16 is a cross-sectional view of a wiper motor according to a second embodiment of the present invention.

The wiper motor 150 shown in FIG. 16 principally includes the motor body 92, a transmission mechanism 152 and a clutch mechanism 210.

The wiper motor 90 according to the above-described first embodiment has a construction that (the armature 108 of) the motor body 92 rotates continuously in a one rotational direction, and the swing mechanism 94 realizes the to-and-fro rotation the output shaft 12. Contrastively, the wiper motor 150 according to the second embodiment has a construction that (the armature 108 of) the motor body 92 itself rotates to and fro by a predetermined rotation angle so as to realize the to-and-fro rotation of the output shaft 12.

The transmission mechanism 152 is provided with the worm gear 122 and a worm wheel 328, yet not provided with the sector gear 132 and the support lever 138 in the first embodiment.

Figure 17:
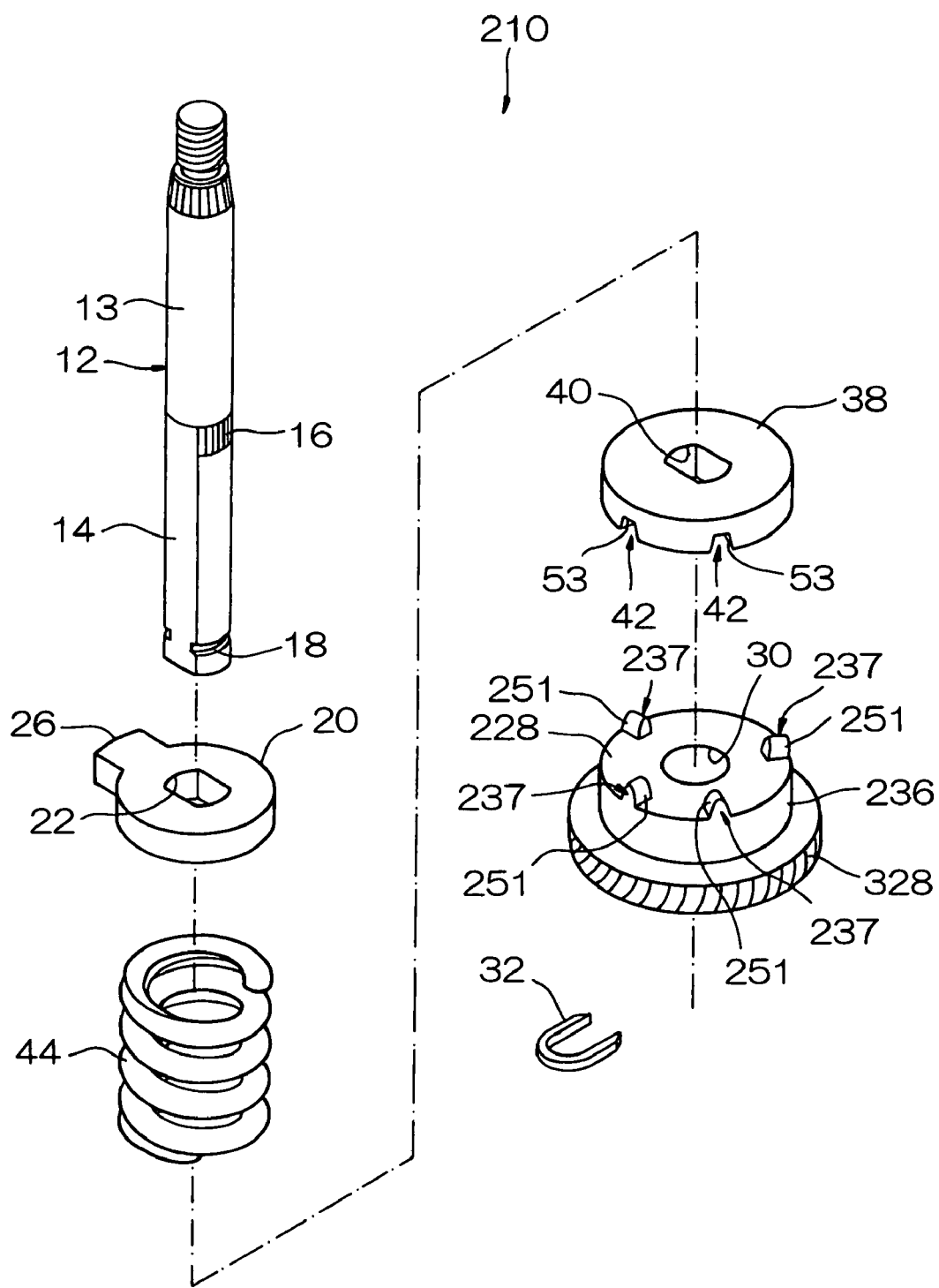
FIG. 17 is an exploded perspective view of a clutch mechanism of the wiper motor according the second embodiment.

In the second embodiment shown in FIG. 17, the worm wheel 328 and an input disk 228 is coaxially and integrally fixed on each other. Then, the worm gear 122 is engaged with the worm wheel 328 that is integrated with the input disk 128.

The input disk 228 in the second embodiment is provided with four engaging protrusions 237, which respectively have sidewalls 251, on its upper surface as same as the input disk 28 in the first embodiment, yet not provided with the gear portion 34 on its lower surface in contrast to the first embodiment. In the second embodiment, the worm wheel 328 is positioned continuously to a lower end portion of the circumferential surface 236 of the input disk 228, as the position of the gear portion 34 with respect to the input disk 28 in the first embodiment.

In the present embodiment, the input disk 228 is made of metal to reduce abrasion and/or deformation, and the worm wheel 328 is made of resin to reduce gearing noise with the worm gear 122. The worm wheel 328 can be cemented on the input disk 228, or fixed integrally on the input disk 228 by insert molding.

In the wiper motor 150, when (the armature 108 of) the motor body 92 rotates, the worm gear 122 transmits the rotational force to the worm wheel 328, to rotate the worm wheel 328 and the input disk 228.

in a normal operational state of the wiper motor 150, the engaging protrusions 237 are engaged with the engaging depressions 42, so that the input disk 228 and the worm wheel 328 rotates of the clutch disk 38 integrally with them. Thus, the wiper 200 that is fixed on the clutch disk 38 and the output shaft 12 performs to-and-fro wiping operation.

When the output shaft 12 is subjected to excessively large external force (load), and the output shaft 12 rotates in a reversal direction or kept being locked, the clutch mechanism 210 shifts from the engaging state to the released state in the same manner as in the first embodiment. When the clutch mechanism 210 is in the released state, the output shaft 12 rotates idle with respect to the worm wheel 328 and the input disk 228. In this manner, it is possible to prevent breakage of each part of the clutch mechanism 210 and each part of the transmission mechanism 152 such as the worm gear 122, which is coupled to the worm wheel 328. Further, it is unnecessary to provide each part of the wiper motor 150 with excessively large strength in view of the action of the excessively large external force (load).

After the clutch mechanism 210 is released, that is, after the output shaft 12 rotates idle with respect to the motor body 92 in the wiper motor 150 according to the second embodiment, subsequent driving operation of the motor body 92 can automatically return the input disk 228 and the clutch disk 38 to their home relative position, by engaging the output shaft 12 again with the motor body side at a predetermined angular position, so as to perform the normal wiping operation. This automatic engagement return is realized by arranging contact position of the engagement base 20 with the stopper protrusion 142 as in the first embodiment.

In the following is described a wiper motor 450 according to a third embodiment of the present invention. In the following description, substantially the same component as in the above-described first and/or second embodiment is respectively assigned the same referential numeral/character as in the first/second embodiment, and not described redundantly.

Figure 18:
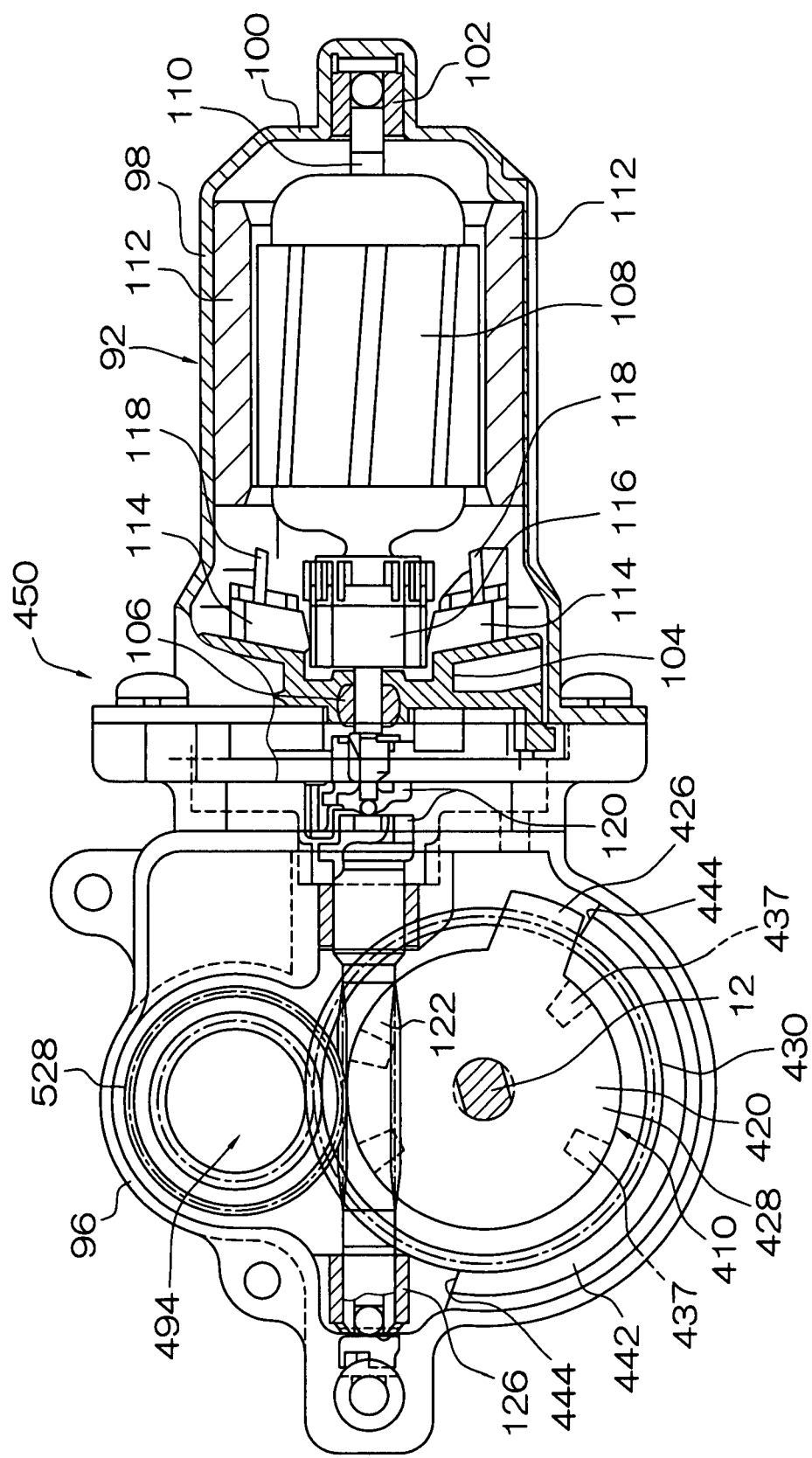
FIG. 18 is a cross-sectional view of a wiper motor according to a third embodiment of the present invention.

The wiper motor 450 shown in FIG. 18 principally includes the motor body 92, a transmission mechanism 494 and a clutch mechanism 410.

Substantially as same as in the second embodiment, the wiper motor 450 according to the third embodiment has a construction that (the armature 108 of) the motor body 92 itself rotates to and fro by a predetermined rotation angle so as to realize the to-and-fro rotation of the output shaft 12.

The transmission mechanism 494 is provided with the worm gear 122, a worm wheel 528 and a speed-reducing gear 430 that further reduces a rotational speed of the worm wheel 528.

In the third embodiment shown in FIG. 18, the speed-reducing gear 430 and an input disk 428 is coaxially and integrally fixed on each other.

The input disk 428 in the third embodiment is provided with four engaging protrusions 437, which respectively have sidewalls, on its upper surface as same as the input disk 28 in the first/second embodiment, yet not provided with the gear portion 34 on its lower surface in contrast to the first embodiment. In the third embodiment, the speed-reducing gear 430 is positioned continuously to a lower end portion of the circumferential surface of the input disk 428, as the position of the worm wheel 328 with respect to the input disk 228 in the second embodiment.

In the present embodiment, the input disk 428 is made of metal to reduce abrasion and/or deformation, and the worm wheel 528 and the speed-reducing gear 430 are made of resin to reduce gearing noise. The speed-reducing gear 430 can be cemented on the input disk 428, or fixed integrally on the speed-reducing gear 430 by insert molding.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wiper motor for pivotally driving a wiper to and fro, the wiper motor comprising:
   a motor body that generates a rotational force;
   an output shaft that is coupled to the wiper so as to rotate the wiper;
   a transmission mechanism that transmits the rotational force from the motor body; and
   a clutch mechanism that transmits the rotational force from the transmission mechanism to the output shaft when the output shaft is subjected to a torque not larger than an engagement releasing torque, and lets the transmission mechanism run idle not to transmit the rotational force from the transmission mechanism to the output shaft when the output shaft is subjected to a torque equal to or larger than the engagement releasing torque, wherein the engagement releasing torque is specified as a value that is larger than a maximum output torque of the wiper motor, which is exerted when the output shaft is locked, wherein:
the clutch mechanism includes an input disk that is arranged coaxially with the output shaft and rotationally driven by the rotational force generated by the motor body, a clutch disk that is installed to the output shaft coaxially with the output shaft so as to face the input disk and a biasing member that biases at least one of the input disk and the clutch disk to bring them close to each other;
the clutch disk is integrally rotatable with the output shaft;
the input disk has a first engaging portion on one side surface thereof to face the clutch disk;
the clutch disk has a second engaging portion on one side surface thereof to be engaged with the first engaging portion of the input disk when the input disk and the clutch disk are in a predetermined relative angle and a clearance between the input disk and the clutch disk is minimized by the biasing means;
the first and second engaging portions are formed so as to be disengaged from each other when a torque acting on the output shaft forcedly rotates the clutch disk with respect to the input disk in increasing the clearance between the input disk and the clutch disk against a biasing force of the biasing means;
the engagement releasing torque is specified by at least one of: adjusted shapes of the first and second engaging portions; and adjusted biasing force of the biasing member;
the second engaging portion of the clutch disk and the first engaging portion of the input disk are configured to maintain engagement therebetween to limit relative rotation between the clutch disk and the input disk when the torque, which is applied by the wiper onto the output shaft, is smaller than the engagement releasing torque; and
the second engaging portion of the clutch disk and the first engaging portion of the input disk are configured to be disengaged from each other to enable the relative rotation between the clutch disk and the input disk when the torque, which is applied by the wiper onto the output shaft, is equal to or larger than the engagement releasing torque.

2. The wiper motor according to claim 1, wherein the engagement releasing torque is specified to a value smaller than a motor breakage torque at which an external force acting on the output shaft is estimated to break the transmission mechanism on a condition that a rotation axis of the motor body is locked not to rotate.

3. The wiper motor according to claim 1, wherein the transmission mechanism includes:
a worm that is arranged coaxially with and is driven by the motor body;
a worm wheel that is engaged with and rotationally driven by the worm; and
a swing member one end portion of which is coupled to the worm wheel at a position radially displaced from its rotation center and the other end portion of which is coupled to the input disk to rotate the input disk to and fro in accordance with a rotation of the worm wheel in one rotational direction.

4. The wiper motor according to claim 1, wherein the transmission mechanism includes:
a worm that is coaxial to and driven by the motor body; and
a worm wheel that is engaged with and rotationally driven by the worm,
wherein the input disk is coaxially integrated with the worm wheel.

5. The wiper motor according to claim 1, wherein the transmission mechanism includes:
a worm that is arranged coaxially with and driven by the motor body;
a worm wheel that is engaged with and rotationally driven by the worm; and
a speed-reducing gear that is engaged with the worm wheel to rotate slower than the worm wheel,
wherein the input disk is coaxially integrated with the speed-reducing gear.

6. The wiper motor according to claim 1, wherein the engagement releasing torque is larger than 10 N·m and is smaller than 20 N·m.

7. A wiper apparatus comprising:
the wiper motor according to claim 1, and wherein
the wiper includes:
a wiper arm that is coupled to the output shaft of the wiper motor at its base end portion; and
a wiper blade that is attached on a leading end portion of the wiper arm.

8. A wiper motor for driving a wiper, the wiper motor comprising:
a motor body that generates a rotational driving force upon driving of the motor body;
an output shaft that is adapted to be coupled to the wiper to rotate the wiper;
a transmission mechanism that is adapted to transmit the rotational driving force from the motor body; and
a clutch mechanism that is placed between the transmission mechanism and the output shaft to conduct the rotational driving force from the transmission mechanism to the output shaft and includes:
an input disk that is coaxial with the output shaft and is adapted to be rotated in a driving rotational direction by the rotational driving force, which is transmitted to the input disk from the motor body through the transmission mechanism;
a clutch disk that is installed to the output shaft to rotate integrally with the output shaft and is opposed to the input disk in an axial direction of the output shaft, wherein the clutch disk is movable relative to the input disk in the axial direction; and
a biasing member that applies a biasing force to the clutch disk to urge the clutch disk against the input disk in the axial direction;
the input disk has at least one engaging portion in a surface of the input disk, which is opposed to the clutch disk in the axial direction;
the clutch disk has at least one engaging portion in a surface of the clutch disk, which is opposed to the input disk in the axial direction;
the biasing force of the biasing member is set to maintain an engagement between the at least one engaging portion of the input disk and the at least one engaging portion of the clutch disk and thereby to enable rotation of the clutch disk by the input disk in the driving rotational direction of the input disk in a rotatable state of the output shaft when an external counter torque, which is applied to the clutch disk from the wiper through the output shaft in a counter rotational direction that is opposite from the driving rotational direction of the input disk, is smaller than a predetermined value that is larger than a maximum output torque, which is applied to the input disk in the driving rotational direction from the motor body at time of driving the motor body at a maximum output of the motor body;

the biasing force of the biasing member is set to enable disengagement between the at least one engaging portion of the input disk and the at least one engaging portion of the clutch disk in the rotatable state of the output shaft upon axial displacement of the clutch disk away from the input disk against the biasing force of the biasing member and thereby to enable relative rotation between the input disk and the clutch disk when the external counter torque, which is applied to the clutch disk from the wiper through the output shaft in the counter rotational direction that is opposite from the driving rotational direction of the input disk, is equal to or larger than the predetermined value; and the biasing force of the biasing member is set to maintain the engagement between the at least one engaging portion of the input disk and the at least one engaging portion of the clutch disk and thereby to substantially hold both of the input disk and the clutch disk still in a non-rotatably arrested state of the output shaft, which is arrested by the wiper, even when the maximum output torque is applied to the input disk in the driving rotational direction from the motor body.

9. The wiper motor according to claim 8, wherein the predetermined value is larger than 10 N·m and is smaller than 20 N·m.

10. The wiper motor according to claim 8, wherein:

one of the at least one engaging portion of the input disk and the at least one engaging portion of the clutch disk is configured as an engaging protrusion; and the other one of the at least one engaging portion of the input disk and the at least one engaging portion of the clutch disk is configured as an engaging depression.

11. The wiper motor according to claim 8, wherein:

the at least one engaging portion of the input disk respectively includes first and second side walls, which are circumferentially opposed to each other;

a circumferential distance between the first side wall and the second side wall of the at least one engaging portion of the input disk progressively increases in the axial direction toward one axial side where the transmission mechanism is located;

the at least one engaging portion of the clutch disk respectively includes first and second side walls, which are circumferentially opposed to each other; and a circumferential distance between the first side wall and the second side wall of the at least one engaging portion of the clutch disk progressively increases in the axial direction toward the one axial side.

12. A wiper apparatus comprising:

the wiper motor according to claim 8, and wherein the wiper includes:

a wiper arm that is coupled to the output shaft of the wiper motor at its base end portion; and a wiper blade that is attached on a leading end portion of the wiper arm.

\* \* \* \* \*